(12) United States Patent
Kim

(10) Patent No.: US 7,969,841 B2
(45) Date of Patent: Jun. 28, 2011

(54) METHOD AND APPARATUS FOR RECORDING MANAGEMENT INFORMATION MEDIUM AND THE RECORDING MEDIUM

(75) Inventor: Yong Kook Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/457,362

(22) Filed: Jun. 9, 2009

(65) Prior Publication Data

US 2009/0252007 A1    Oct. 8, 2009

Related U.S. Application Data

(63) Continuation of application No. 11/147,198, filed on Jun. 8, 2005, now Pat. No. 7,570,557.

(30) Foreign Application Priority Data

Jun. 8, 2004 (KR) .................. 10-2004-0041844

(51) Int. Cl.
    *G11B 7/00* (2006.01)
(52) U.S. Cl. ............... 369/53.15; 369/53.17; 369/47.14; 369/53.16
(58) Field of Classification Search ................ 369/53.15
    See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi |
| 4,807,205 A | 2/1989 | Picard |
| 4,963,866 A | 10/1990 | Duncan |
| 5,065,388 A | 11/1991 | Roth et al. |
| 5,068,842 A | 11/1991 | Naito |
| 5,111,444 A | 5/1992 | Fukushima et al. |
| 5,210,734 A | 5/1993 | Sakurai |
| 5,235,585 A | 8/1993 | Bish et al. |
| 5,237,553 A | 8/1993 | Fukushima et al. |
| 5,247,494 A | 9/1993 | Ohmo et al. |
| 5,319,626 A | 6/1994 | Ozaki et al. |
| 5,404,357 A | 4/1995 | Ito et al. |
| 5,442,611 A | 8/1995 | Hosaka |
| 5,448,728 A | 9/1995 | Takano et al. |
| 5,475,820 A | 12/1995 | Natrasevschi et al. |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |

(Continued)

FOREIGN PATENT DOCUMENTS

CN        1134017        10/1996

(Continued)

OTHER PUBLICATIONS

European Office Action dated Jun. 11, 2010 for European Application No. 05 749 399.1.

(Continued)

*Primary Examiner* — Jorge L Ortiz Criado
(74) *Attorney, Agent, or Firm* — Harness, Dickey & Pierce, P.L.C.

(57) ABSTRACT

The write-once recording medium has a data structure for managing temporary defect management areas, TDMAs, of the recording medium, where each TDMA is for at least storing temporary defect management information. In one embodiment, the recording medium includes a TDMA access indicator, TAI, area for selectively storing data indicating which one of the TDMAs is currently in use.

13 Claims, 19 Drawing Sheets

U.S. PATENT DOCUMENTS

| | | | |
|---|---|---|---|
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,848,038 A | 12/1998 | Igarashi |
| 5,867,455 A | 2/1999 | Miyamoto et al. |
| 5,878,020 A | 3/1999 | Takahashi |
| 5,914,928 A | 6/1999 | Takahashi |
| 5,940,702 A | 8/1999 | Sakao |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,188,653 B1 | 2/2001 | Nagano et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,496,807 B1 | 12/2002 | Inokuchi et al. |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,594,209 B2 | 7/2003 | Ijtsma et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,725,400 B1 | 4/2004 | Ko |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,355,934 B2 | 4/2008 | Park et al. |
| 7,379,402 B2 | 5/2008 | Ko et al. |
| 7,383,411 B2 | 6/2008 | Ko |
| 7,428,670 B2 | 9/2008 | Hwang et al. |
| 7,483,349 B2 | 1/2009 | Park et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0068159 A1 | 4/2003 | De Haan |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0073832 A1 | 4/2004 | Ko |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |
| 2006/0077827 A1 | 4/2006 | Takahashi |
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |

| | | | |
|---|---|---|---|
| 2006/0233078 A1 | 10/2006 | Terada et al. | |
| 2007/0211591 A1 | 9/2007 | Park et al. | |
| 2007/0294571 A1 | 12/2007 | Park et al. | |
| 2008/0046780 A1 | 2/2008 | Shibuya et al. | |
| 2008/0112693 A1 | 5/2008 | De Haan | |
| 2008/0279073 A1 | 11/2008 | Gotoh et al. | |

FOREIGN PATENT DOCUMENTS

| | | |
|---|---|---|
| CN | 1140897 | 1/1997 |
| CN | 1200536 A | 12/1998 |
| CN | 1227950 | 9/1999 |
| CN | 1273419 | 11/2000 |
| CN | 1328327 | 12/2001 |
| CN | 1329334 A | 1/2002 |
| CN | 1675708 | 9/2005 |
| CN | 1685426 | 10/2005 |
| DE | 199 54 054 | 6/2000 |
| EP | 0 314 186 | 5/1989 |
| EP | 0 325 823 | 8/1989 |
| EP | 0 350 920 | 1/1990 |
| EP | 0 464 811 | 7/1991 |
| EP | 0 472 484 | 2/1992 |
| EP | 0 477 503 | 4/1992 |
| EP | 0 556 046 | 8/1993 |
| EP | 0 871 172 | 10/1998 |
| EP | 0 908 882 | 4/1999 |
| EP | 0 997 904 | 8/1999 |
| EP | 0 974 967 | 1/2000 |
| EP | 0 989 554 | 3/2000 |
| EP | 1 026 681 | 8/2000 |
| EP | 1 043 723 A1 | 10/2000 |
| EP | 1 132 914 | 9/2001 |
| EP | 1 148 493 | 10/2001 |
| EP | 1 152 414 | 11/2001 |
| EP | 1 239 478 | 9/2002 |
| EP | 1 274 081 | 1/2003 |
| EP | 1 298 659 | 4/2003 |
| EP | 1 329 888 A1 | 7/2003 |
| EP | 1 347 452 | 9/2003 |
| EP | 1 564 740 | 8/2005 |
| EP | 1 612 790 | 1/2006 |
| EP | 1 662 505 | 5/2006 |
| GB | 2 356 735 | 5/2001 |
| JP | 63-091842 | 4/1988 |
| JP | 64-046280 | 2/1989 |
| JP | 1-263955 | 10/1989 |
| JP | 2-023417 | 1/1990 |
| JP | A-42-83469 | 10/1992 |
| JP | 5-274814 | 10/1993 |
| JP | 6-349201 | 12/1994 |
| JP | A-07-029177 | 1/1995 |
| JP | 8-096522 | 4/1996 |
| JP | 9-145634 | 6/1997 |
| JP | 9-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 10-289524 | 10/1998 |
| JP | A-10-289524 | 10/1998 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-056619 | 2/2002 |
| JP | 2002-215612 | 8/2002 |
| JP | 2002-245723 | 8/2002 |
| JP | 2002-288938 | 10/2002 |
| JP | 2002-329321 | 11/2002 |
| JP | 2002-352522 | 12/2002 |
| JP | A-2003-030844 | 1/2003 |
| JP | 2003-91938 | 3/2003 |
| JP | 2004-280864 | 10/2004 |
| JP | 2004-280865 | 10/2004 |
| JP | 2005-004912 | 1/2005 |
| JP | A-2005-056542 | 3/2005 |
| JP | 2005-535993 | 11/2005 |
| JP | 2005-538490 | 12/2005 |
| JP | 2005-538491 | 12/2005 |
| JP | 2006-519445 | 8/2006 |
| JP | 2007-501488 | 1/2007 |
| JP | A-2008-112577 | 5/2008 |
| KR | 10-2004-0015602 | 3/2004 |
| RU | 2 208 844 C2 | 7/2003 |
| RU | 2 223 556 | 2/2004 |
| TW | 371752 | 10/1999 |
| TW | 413805 | 12/2000 |
| WO | WO 84/00628 | 2/1984 |
| WO | WO 96/30902 | 10/1996 |
| WO | WO 97/22182 | 6/1997 |
| WO | WO 00/54274 | 9/2000 |
| WO | WO 01/22416 | 3/2001 |
| WO | WO 01/93035 | 12/2001 |
| WO | WO 03/007296 | 1/2003 |
| WO | WO 03/025924 | 3/2003 |
| WO | WO 03/030173 | 4/2003 |
| WO | WO 03/079353 | 9/2003 |
| WO | WO 2004/015707 | 2/2004 |
| WO | WO 2004/015708 | 2/2004 |
| WO | WO 2004/025648 | 3/2004 |
| WO | WO 2004/025649 | 3/2004 |
| WO | WO 2004/029668 | 4/2004 |
| WO | WO 2004/029941 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/059648 | 7/2004 |
| WO | WO 2004/068476 | 8/2004 |
| WO | WO 2004/075180 | 9/2004 |
| WO | WO 2004/077432 | 9/2004 |
| WO | WO 2004/077432 A1 | 9/2004 |
| WO | WO 2004/079631 | 9/2004 |
| WO | WO 2004/079731 | 9/2004 |
| WO | WO 2004/079731 A1 | 9/2004 |
| WO | WO 2004/079740 | 9/2004 |
| WO | WO 2004/081922 | 9/2004 |
| WO | WO 2004/081926 | 9/2004 |
| WO | WO 2004/093065 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |
| WO | WO 2005/013265 | 2/2005 |
| WO | WO 2005/013266 | 2/2005 |
| WO | WO 2005/062306 | 7/2005 |
| WO | WO 2005/073971 | 8/2005 |

OTHER PUBLICATIONS

European Office Action dated Jun. 29, 2010 for European Application No. 07 150 336.1.

Japanese Office Action for Japanese Patent Application No. 2006-522508 dated Sep. 18, 2009.

Japanese Office Action for Japanese Patent Application No. 2006-023366 dated Sep. 18, 2009.

Notice of Allowance for counterpart Russian Application No. 2006143444 dated Jan. 29, 2010 with English translation.

"JIS Handbook Data Processing for Hardware," Japanese Standards Association Inc., Japan, Apr. 21, 1999, pp. 1064-1070.

International Search Report and Written Opinion dated Aug. 31, 2004.

International Search Report and Written Opinion dated Jan. 13, 2006.

International Search Report and Written Opinion dated Mar. 8, 2007.
International Search Report dated Jan. 13, 2006.
Search Report for corresponding European Application No. 07110035.8 dated Jun. 5, 2008.
Office Action for corresponding Russian Application No. 2006104619/28 dated Jun. 26, 2008.
Yokozeki et al., "A Virtual Optical Disk Method to Realize Rewritability and Revision Control on a Write-Once Optical Disk," Systems & Computers in Japan, vol. 21, No. 8, pp. 34-43, Jan. 1, 1990.
European Search Report dated Mar. 23, 2009 for corresponding European Application No. 07150336.1.
European Office Action dated Jun. 4, 2010 for European Application No. 07 122 129.5.
Russian Office Action and English translation dated May 12, 2009.
European Search Report dated May 15, 2009.
Notice of Allowance mailed Jun. 4, 2010 for corresponding Japanese Patent Application No. 2006-522508 with English translation.
Notice of Allowance dated Sep. 28, 2010 for corresponding Russian Patent Application No. 2009111334.
Chinese Patent Gazette dated Dec. 15, 2010 for corresponding Chinese Patent Application No. 200810098852.3.
Chinese Patent Gazette dated Jan. 26, 2011 for corresponding Chinese Patent Application No. 200710301097.X.
Chinese Patent Gazette dated Feb. 9, 2011 for corresponding Chinese Patent Application No. 200710301100.8.

< Single Layer Disc >

< Dual Layer Disc >

< Single Layer Disc >

< Dual Layer Disc >

< Dual Layer Disc >

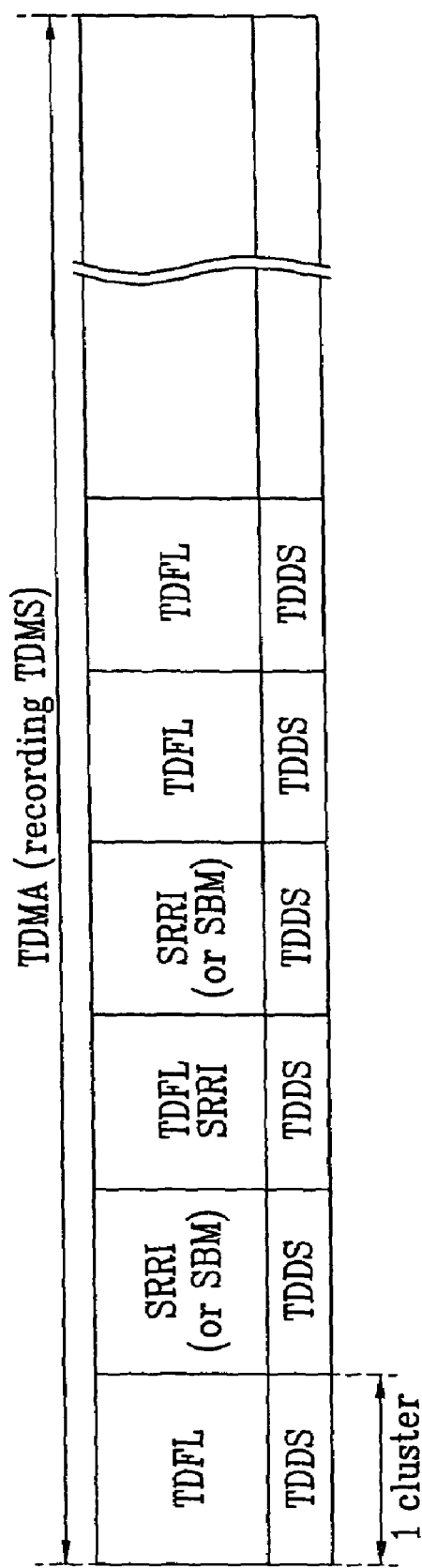

FIG. 5B

| Contents | N.B. | |
|---|---|---|
| TDDS identifier = "DS" | 2 | |
| TDDS format = 00h | 1 | |
| TDDS Update Count | 4 | |
| first PSN of Drive Area(P_DA) | 4 | |
| first PSN of Defect List(P_DFL) | 4 | ←"00h" |
| Location of LSN 0 of User Data Area | 4 | |
| last LSN of User Data Area | 4 | |
| Inner Spare Area 0 size(ISA0_size) | 4 | |
| Outer Spare Area size(OSA_size) | 4 | |
| Inner Spare Area 1 size(ISA1_size) | 4 | |
| Spare Area Full flags | 1 | |
| Recording Mode | 1 | |
| general flag bits | 1 | |
| Inconsistency flags | 2 | |
| Last Recorded Address of User Data Area | 4 | |
| Size of TDMAs in Outer Spare Area | 4 | |
| Size of TDMA in Inner Spare Area 1 | 4 | |
| first PSN of 1th Cluster of Defect List(P_1th DFL) | 4 | |
| ... | ... | |
| first PSN of 8th Cluster of Defect List(P_8th DFL) | 4 | |
| first PSN of SRRI/SBM for L0(P_SRRI/P_SBM0) | 4 | |
| first PSN of SBM for L1(P_SBM1) | 4 | |
| next available PSN of ISA0(P_ISA0) | 4 | |
| next available PSN of OSA0(P_OSA0) | 4 | |
| next available PSN of ISA1(P_ISA1) | 4 | |
| next available PSN of OSA1(P_ISA1) | 4 | |
| Year/Month/Date of recording | 4 | |
| drive ID: Manufactures Name, | 48 | |
| Additional ID | 48 | |
| Unique serial number | 32 | |

1 Sector

< TDDS format >

TDMA Indicator cluster

FIG. 7B

| Contents | N.B. | |
|---|---|---|
| TDDS identifier = "DS" | 2 | |
| TDDS format = 00h | 1 | |
| TDDS Update Count | 4 | |
| first PSN of Drive Area(P_DA) | 4 | |
| first PSN of Defect List(P_DFL) | 4 | ← Unique Value in each DDS1~DDS4 |
| Location of LSN 0 of User Data Area | 4 | |
| last LSN of User Data Area | 4 | |
| Inner Spare Area 0 size(ISA0_size) | 4 | |
| Outer Spare Area size(OSA_size) | 4 | |
| Inner Spare Area 1 size(ISA1_size) | 4 | |
| Spare Area Full flags | 1 | |
| Recording Mode | 1 | |
| general flag bits | 1 | |
| Inconsistency flags | 2 | |
| Last Recorded Address of User Data Area | 4 | |
| Size of TDMAs in Outer Spare Area | 4 | |
| Size of TDMA in Inner Spare Area 1 | 4 | |
| first PSN of 1th Cluster of Defect List(P_1th DFL) | 4 | |
| ... | ... | |
| first PSN of 8th Cluster of Defect List(P_8th DFL) | 4 | |
| first PSN of SRRI/SBM for L0(P_SRRI/P_SBM0) | 4 | |
| first PSN of SBM for L1(P_SBM1) | 4 | |
| next available PSN of ISA0(P_ISA0) | 4 | |
| next available PSN of OSA0(P_OSA0) | 4 | |
| next available PSN of ISA1(P_ISA1) | 4 | |
| next available PSN of OSA1(P_ISA1) | 4 | |
| Year/Month/Date of recording | 4 | |
| drive ID: Manufactures Name, | 48 | |
| Additional ID | 48 | |
| Unique serial number | 32 | |

1 Sector

< DDS format >
= latest TDDS value except for P_DFL

DMA Indicator cluster

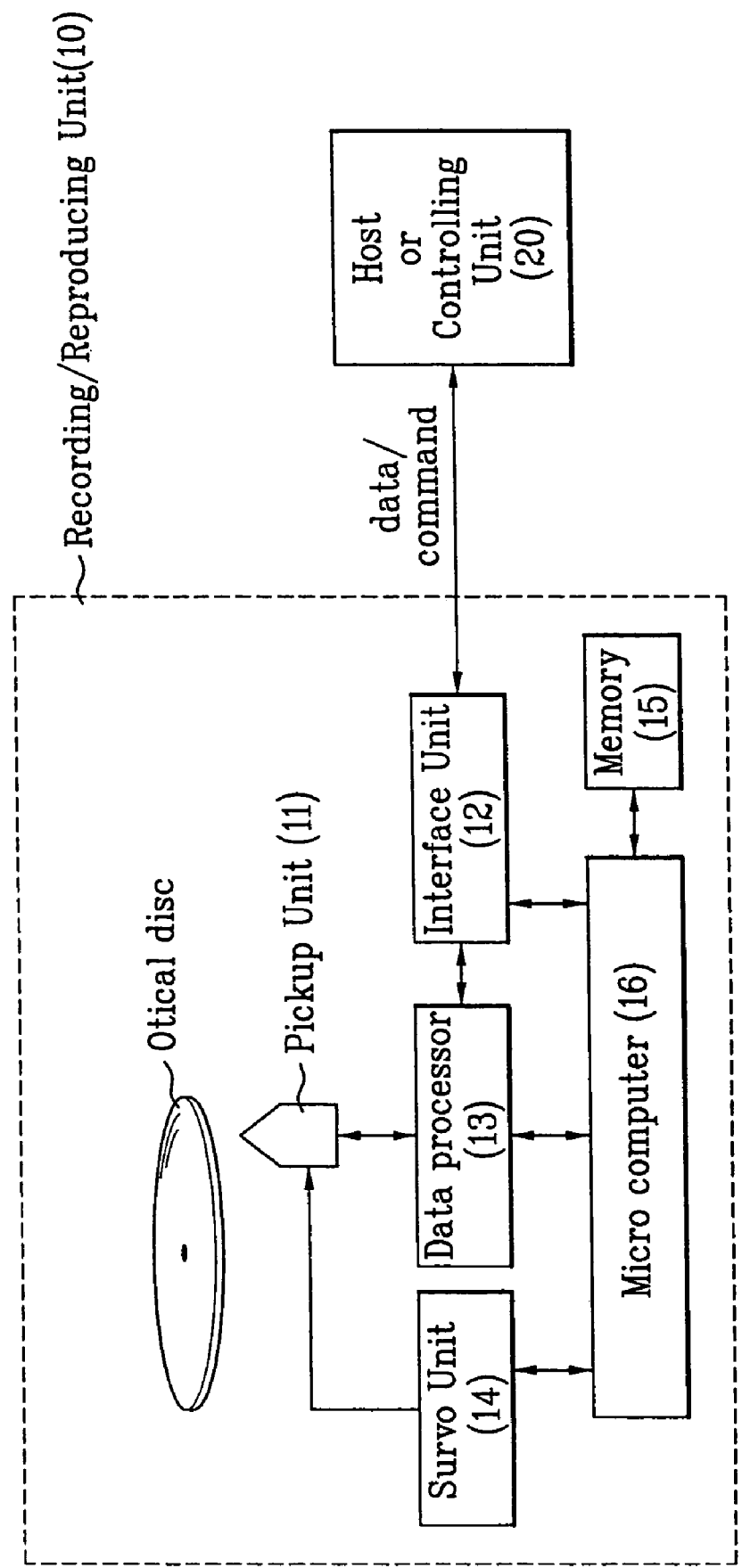

US 7,969,841 B2

METHOD AND APPARATUS FOR RECORDING MANAGEMENT INFORMATION MEDIUM AND THE RECORDING MEDIUM

PRIORITY INFORMATION

This application is a continuation of U.S. application Ser. No. 11/147,198 filed Jun. 8, 2005 now U.S. Pat. No. 7,570,557, which claims the benefit of the Korean Patent Application No. 10-2004-0041844, filed on Jun. 8, 2004, the entire contents of which are hereby incorporated by reference.

BACKGROUND OF THE INVENTION

1. Field of the Invention

The present invention relates to write-once recording media, and more particularly, to a method and an apparatus for recording management information on a write-once recording medium and the recording medium.

2. Discussion of the Related Art

An optical disc has been widely used as an optical recording medium to record large amounts of data. Recently, a blu-ray disc (BD) has been introduced as a high density digital video disc (HD-DVD) for recording high definition video data and superior sound quality audio data.

The BD has been spotlighted as a next generation of HD-DVD and as a next generation optical recording solution for storing more data than a conventional DVD.

Accordingly, various specifications of the BD have been standardized including a rewritable blu-ray disc (BD-RE) and a write once blu-ray disc (BD-WO).

FIG. 1 is a diagram showing a structure of a recording area in a rewritable blu-ray disc (BD-RE) in accordance with the prior art. Particularly, FIG. 1 shows a recording area structure of a disc having a single layer.

The rewritable blu-ray disc (BD-RE) is divided into a lead-in area, a data area and a lead-out area from an inner circumference of the blu-ray disc. The data area is further divided to an inner spare area (ISA), a user data area and an outer spare area (OSA). The ISA is arranged at an inner circumference of the data area and the OSA is arranged at an outer circumference of the data area for replacing defective areas in the data area. User data is recorded in the user data area.

During the recording of data on the BD-RE having the above mentioned structure, a surface of the BD-RE may be damaged or polluted by various factors. As a result, defect areas are generated. If the defect area is generated during recording data, data recorded in the defect area is transferred to spare areas such as the ISA and the OSA.

When transferring data to the spare areas, management information of the defect area is recorded in a defect management area (DMA) of the lead-in area or the lead-out area. The defect management area is shown in FIG. 1 as DMA1 to DMA4. The management information of a defect area includes location information of the defect area and the spare area where the data of the defect area is recorded.

A minimum recording unit of the BD is a cluster. A single cluster includes 32 sectors and a single sector includes 2048 bytes.

Since data can be rewritable at the any location in the BD-RE, data may be recorded at random locations without consideration of a recording method. The management information also can be rewritable in the DMA. Accordingly, the defect area can be sufficiently managed with a small DMA by using a method of updating the management information in the DMA. That is, 32 clusters generally are allocated to each DMA of the BD-RE.

In case of a write once disc, data may only be recorded one time in recording areas of the write once disc. Accordingly, recording data is limited by the recording method. Therefore, defect management has become a major factor in a high density write once disc such as the write once blu-ray disc (BD-WO).

The defect management area is required in the write once disc for recording defect management information and disc use state information. A defect management method of the write once disc becomes more complicated compared to the rewritable disc because of the write once characteristic. However, a unified standard supporting the above mentioned requirements of the write once disc is not completely standardized and thus an effective management method has been in great demand.

SUMMARY OF THE INVENTION

The present invention relates to a recording medium having a data structure for managing a write-once recording medium.

In one embodiment, the write-once recording medium has a data structure for managing temporary defect management areas, TDMAs, of the recording medium, where each TDMA is for at least storing temporary defect management information. In this embodiment, the recording medium includes a TDMA access indicator, TAI, area for selectively storing data indicating which one of the TDMAs is currently in use.

In one embodiment, the recording medium includes TDMA0 to TDMAn for storing temporary defect management information, and the TAI area includes a sub-area corresponding to each one of TDMA1 to TDMAn, respectively. Each sub-area includes data if the corresponding TDMA has been used.

The sub-area including data that corresponds to a highest numbered TDMA indicates that the highest numbered TDMA is the TDMA currently in use.

For example, if a TDMA has been used, the corresponding sub-area includes a first temporary disc definition structure, TDDS, which is recorded in the TDMA. The TDDS includes at least one pointer to information in the TDMA.

As another example, if a TDMA has been used, the corresponding sub-area includes a plurality of copies of a first temporary disc definition structure, TDDS, which is recorded in the TDMA.

Furthermore, in an embodiment, the sub-area including data that corresponds to the highest numbered TDMA further indicates that lower numbered TDMAs have been completely used.

In one embodiment, the sub-areas are clusters. Accordingly, if a TDMA has been used, the corresponding cluster may have a first sector storing a first temporary disc definition structure, TDDS, which is recorded in the TDMA. Or, if a TDMA has been used, each sector of the corresponding cluster includes a first temporary disc definition structure, TDDS, which is recorded in the TDMA.

In one embodiment, the clusters are clusters of the TDMA0. For example, the clusters corresponding to TDMAn to TDMA1 may be a second to (n+1)th cluster of the TDMA0.

In another embodiment, the TAI area also includes a first cluster of the TDMA0, and the first cluster indicates whether the recording medium is closed. For example, the first cluster indicates that the recording medium is closed if the first cluster includes data. In one embodiment, if the recording medium is closed, a first sector of the first cluster includes the defect data structure, DDS, recorded in a defect management area, DMA. In another embodiment, if the recording medium is closed, each sector of the first cluster includes the defect data structure, DDS, recorded in a defect management area, DMA.

In a further embodiment, the TAI area indicates which of the TDMAs are completely used.

In a still further embodiment, the TAI area indicates whether the recording medium is closed.

The present invention further provides apparatuses and methods for recording and reproducing according to the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5A illustrates various disc defect management information recorded in a TDMA and temporary disc management structure (TDMS) information representing a disc use state in accordance with an embodiment of the present invention;

FIG. 5B illustrate a structure of a TDDS among TDMS according to an embodiment of the present invention;

FIGS. 7A and 7B illustrates a structure of management information recorded in a DMA according to an embodiment of the present invention when a disc is closed;

FIG. 9 illustrate an optical disc recording/reproducing apparatus in accordance with an embodiment of the present invention.

DETAILED DESCRIPTION OF EXAMPLE EMBODIMENTS

Reference will now be made in detail to example embodiments of the present invention, which are illustrated in the accompanying drawings. Wherever possible, the same reference numbers will be used throughout the drawings to refer to the same or like parts.

Figure 2A:
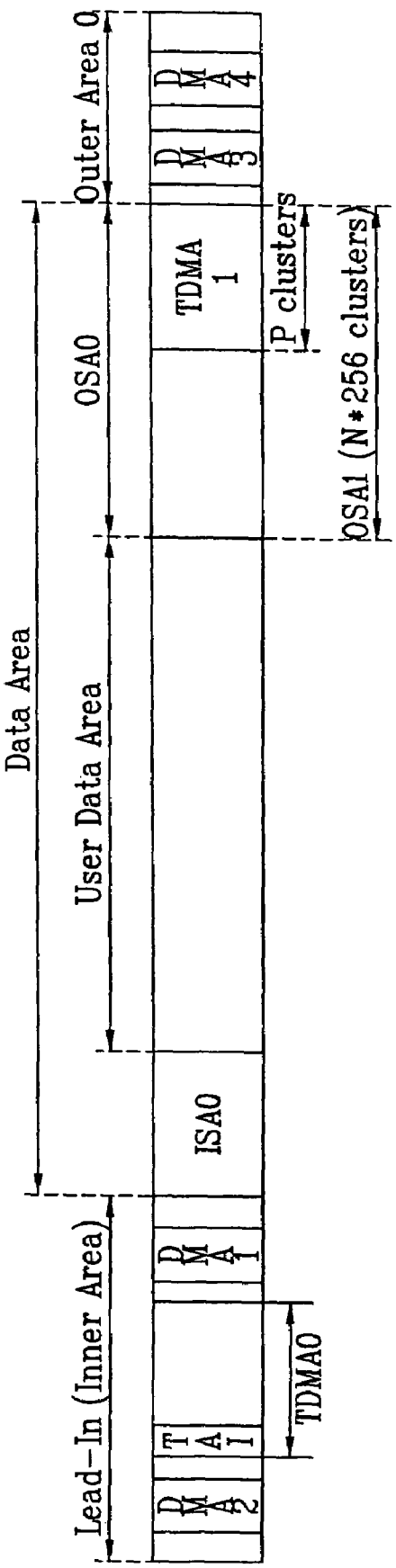
FIGS. 2A and 2B illustrate a structure of an optical write once disc and a method for recording management information in accordance with an embodiment of the present invention.
Figure 2B:
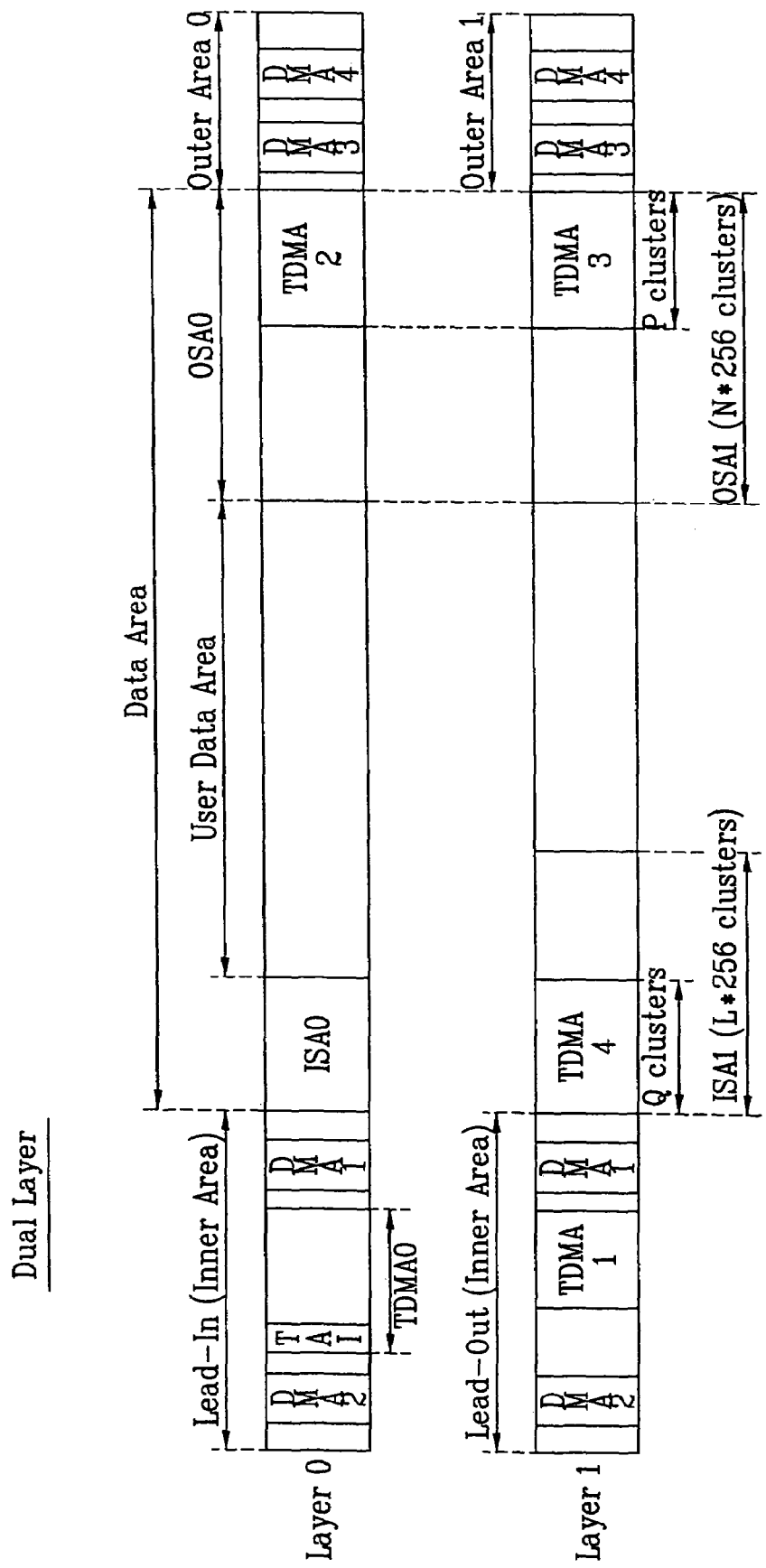

FIGS. 2A to 2B are diagrams illustrating a structure of an optical write once disc and a method for recording management information in accordance with an embodiment of the present invention. FIG. 2A shows a single layer disc having one recording layer and FIG. 2B shows a dual layer disc having two recording layers.

The single layer disc having one recording layer of FIG. 2A is divided into a lead-in area, a data area and a lead-out area from an inner circumference of the blu-ray disc. The data area is further divided into an inner spare area (ISA), a user data area and an outer spare area (OSA). The ISA is arranged at inner circumference of the data area and the OSA is arranged at outer circumference of the data area for replacing a defect area in the data area. User data is recorded in the user data area.

In contrast with a rewritable optical disk, the optical write once disc includes a plurality of temporary disc management area (TDMA) besides a plurality of disc management areas (DMA) because of the characteristics of the optical write once disc.

Figure 1:
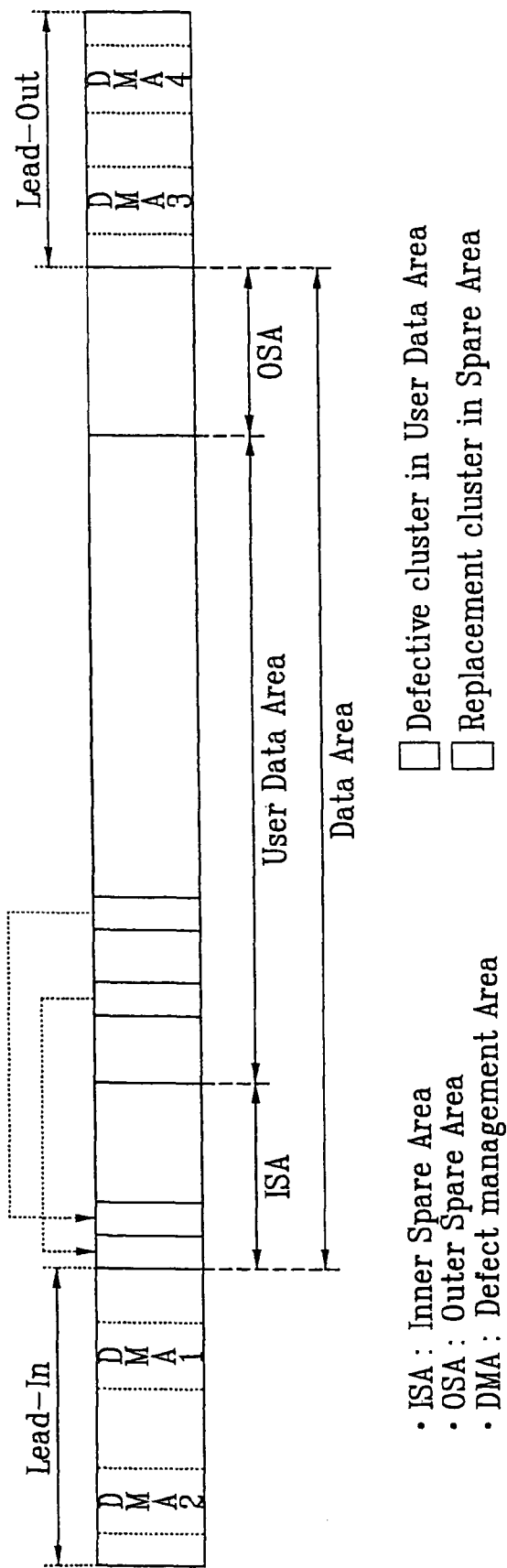
FIG. 1 illustrates a recording area structure of a rewritable blu-ray disc (BD-RE) in accordance with a prior art.

The DMA of FIG. 1 is used for defect area management, but the DMAs of FIGS. 2A and 2B are used to record final management information when a disc is closed in the BD-WO (Blu-ray write-once disc). The final management information includes not only the defect management information, but also a recording state of the disc. Therefore, in the BD-WO, it is defined as the disc management area (DMA).

Also, the TDMA is an area where the disc management information is updated before disc closing. The TDMA is classified into two types: a TDMA0 area and a TDMA1 area. The TDMA0 is located in the lead-in area and has a fixed size of 2048 physical clusters. The TDMA1 is located in the outer spare area (OSA) and has a variable size, which varies according to a size of the OSA.

The TDMA0 may be defined as necessary disc management area and the TDMA1 may be defined as alternative or optional disc management area. It is possible to decide the size of TDMA1 when a corresponding area is allocated to the TDMA1. Preferably, ¼ of the spare area is allocated to the TDMA1. Accordingly, a size of the TDMA1 is P=N*256/4 cluster, wherein P is a size of the TDMA1 and N is the number of sectors in the spare area containing the TDMA1.

Also, the plurality of TDMAs are used according to a predetermined order. That is, the TDMA0 may be firstly used and the TDMA1 may then used. Identification numbers of TDMAs may be assigned based on the order of using the TDMAs.

In the present embodiment, management information for managing the plurality of TDMAs and the DMA may additionally be recorded in a front part of the TDMA0.

The management information provides information indicating which TDMA is currently used. This information may be accessed when an optical disc is loaded in a recording/reproducing apparatus. Accordingly, the final defect management information and the disc use state information are easily reproduced at initial access. Thus, an initial access time is reduced.

Furthermore, the disc closing can be confirmed by using the management information. This will be explained in later.

Information related to accessing a currently used TDMA may be defined as a TDMA access indicator (TAI) information in the present embodiment. The TAI information may be expressed using a first two clusters among the 2048 clusters of the TDMA0. The area of the first two clusters is referred to as TAI area in the present embodiment.

FIG. 2B shows a structure of a dual layer disc having two recording layers. The dual layer disc includes a first recording layer layer0 and a second recording layer layer1. The first recording layer includes a lead-in area as a management area of an outer circumference area, a data area and an outer area 0. The lead-in area may be called an inner area. The data area of the first recording layer layer0 includes an inner spare area ISA0, a user data area and an outer spare area OSA0. Also, the second recording layer includes a lead-out area as a management area of an outer circumference area, a data area and an outer area 1. The lead-out area of the second recording layer may also be called an inner area. The data area of the second recording layer includes an inner spare area ISA1, a user data area, and an outer spare area OSA1.

The write once dual layer optical disc of FIG. 2B also includes a plurality of temporary disc management areas TDMAs beside a disc management area (DMA) to provide areas for recording various disc management information. In FIG. 2B, the temporary disc management areas are shown as TDMA0, TDMA1, TDMA2 and TDMA3.

The TDMA0 and TDMA1 in the inner areas may have a fixed size 2048 clusters and the TDMA2, TDMA3, TDMA4 in the spare areas OSA0, OSA1, ISA1 may have a variable size, which varies according to a size of the spare area. As mentioned above, the size of the TDMA2, TDMA3, TDMA4 may be ¼ of the spare area. Accordingly, a size of the TDMA2 and the TDMA3 may be P=N*256/4 and a size of the TDMA4 may be Q=L*256/4, wherein P is the size of the TDMA2 and TDMA3, N is the number of sectors of the spare area, Q is the size of the TDMA4 and L is the number of sectors of the ISA1.

The plurality of TDMAs may be used according to a predetermined use order. For example, the TDMA0 may be firstly used and the TDMA1 may be then used. That is, the identification numbers of the TDMAs may be assigned based on the order of using the TDMAs.

In the dual layer disc of the present embodiment, management information for managing the plurality of TDMAs is recorded in a front part of the TDMA0. It is very helpful to provide information on which TDMA is currently used. As mentioned above, the final defect management information and the disc use state information are easily reproduced at an initial access time by providing the information indicating the currently used TDMA. Thus, an initial access time is reduced.

Similar to the single layer disc, information for easy access of the currently used TDMA and representing disk closing is referred to as TDMA access indicator (TAI) information in the dual layer disc of the present embodiment. In the dual layer disc, the TAI information may be provided by the first five clusters among the 2048 clusters in the TDMA0. Therefore, an area of the first five clusters is referred to as a TAI area.

According to the predetermined use order of the TDMAs, temporary disc management structure (IDMS) information is first updated at the TDMA0. When the space of the TDMA0 is completely occupied by the updating of the TDMS information, the TDMS information is then updated in the TDMA1. A method for providing the TAI information indicating which TDMA is currently used and whether the disc is closed or not and a method for recording the TAI information will be explained hereinafter with reference to FIGS. 3A and 3B.

Figure 3A:
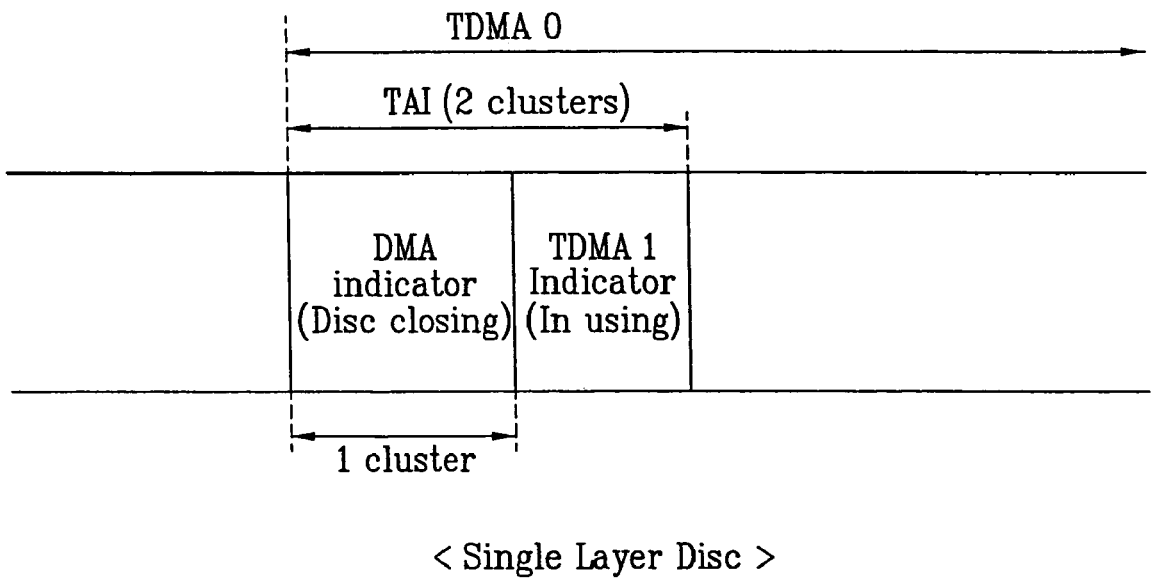
FIGS. 3A to 4C illustrate a method for TAI indicating whether TDMA and DMA are used in accordance with an embodiment of the present invention.
Figure 3B:
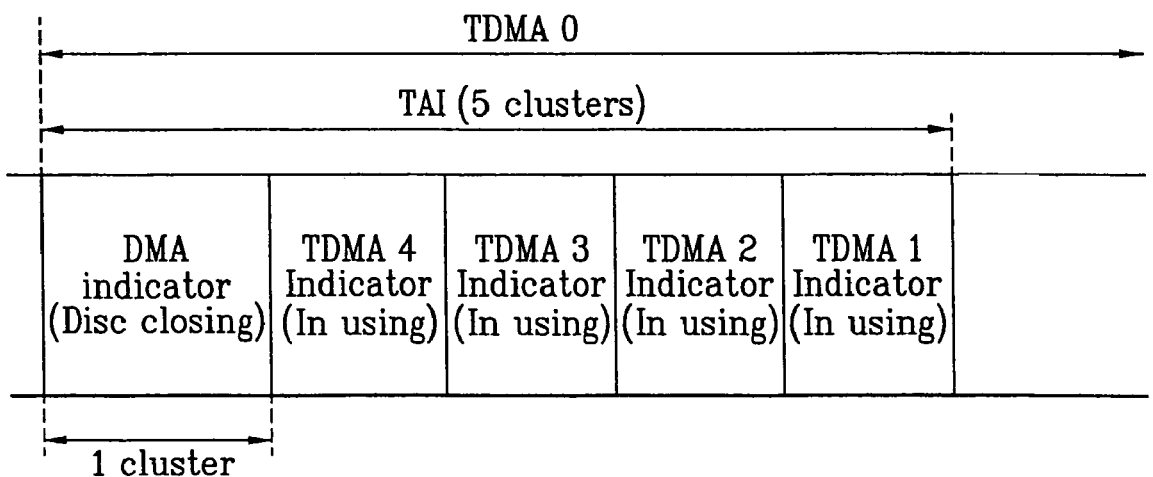

FIG. 3A is a diagram showing a method for recording a TDMA access indicator (TAI) in case of single layer disc according to an embodiment of the present invention, and FIG. 3B is a diagram showing a method of recording a TDMA access indicator (TAI) in case of dual layer disc according to an embodiment of the present invention.

In case of the single layer disc having one recording layer as shown in FIG. 3A, the TAI is provided by using the first two clusters among the clusters in the TDMA0. That is, the TAI includes two clusters for indicating whether the disc is closed or not and indicating which TDMA is currently used.

One of the two clusters is used as a DMA disc closing indicator for indicating whether the disc is closed or not, and other cluster is used as a TDMA1 in use indicator representing whether the TDMA1 is currently used.

As mentioned above, the single layer disc in this embodiment includes a maximum of two TDMAs (TDMA0 and TDMA1). The TAI information requires one cluster for managing the TDMAs in the single layer disc. If the TDMA1 indicator cluster is not recorded in the TAI, it represents that the TDMA0 is currently used, and if the TDMA1 indicator cluster is recorded in the TAI, it represents that the TDMA1 is currently used.

In other words, when the optical recording apparatus firstly uses the TDMA0 and the TDMA0 is fully occupied with the updated information, the optical recording apparatus records the TDMA1 indicator in the TAI for representing that the TDMA1 is currently used.

Figure 4A:
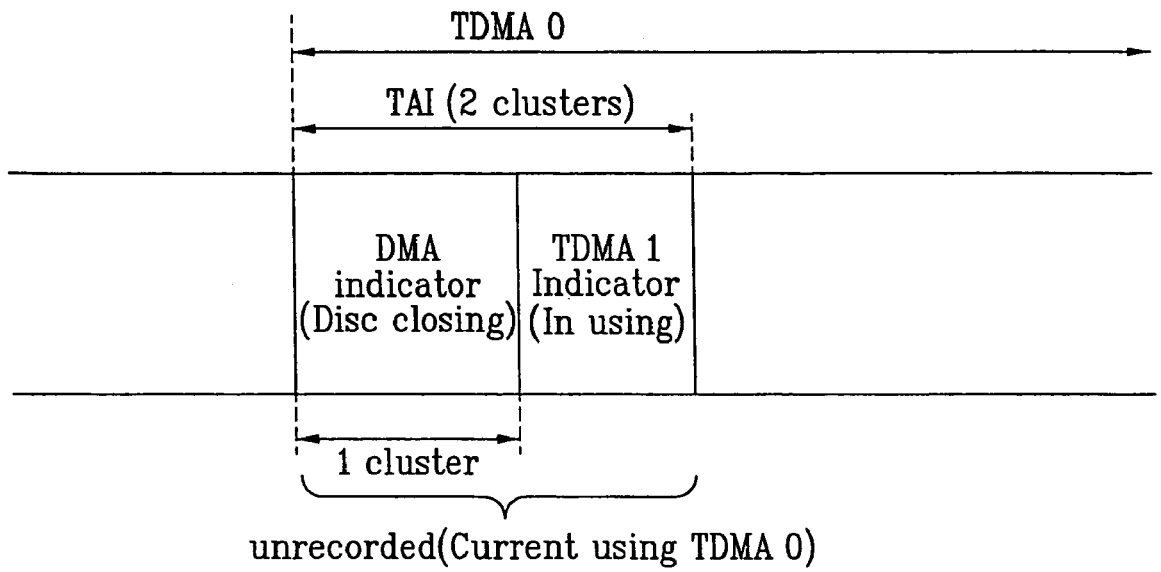

For example, if there is not recorded a TDMA1 indicator in the TAI (unrecorded) as shown in FIG. 4A, it represents that the TDMA0 is currently used.

Recording the TDMA1 indicator in the TAI may be achieved by recording any data in the corresponding cluster. Meaningless dummy data may be recorded in the corresponding cluster in the TAI or real data such as the TDDS may be recorded in the corresponding cluster.

In the present embodiment, the most recent TDDS included in the recording/reproducing apparatus is recorded in one of the clusters in the TAI as the TDMA1 indicator instead of dummy data. Also, a first TDDS of the corresponding TDMA may be recorded in one of clusters in the TAI as the TDMA1 indicator. The TDDS has a size of 1 sector and is recorded in a last sector of the TDMS.

Accordingly, only one sector is occupied by the TDDS and the other 31 sectors may be occupied by dummy data when the TDDS is recorded in the TAI. However, as another alternative the TDDS is repeatedly recorded in all 32 sectors of the cluster in the TAI for increasing robustness of reading the TDDS. Detailed explanation of the TDMS and the TDDS will be provided in later.

If the TDDS is repeatedly recorded in a cluster of the TAI, the recording/reproducing apparatus can simultaneously read the TDDS during confirming a recording state of the TAI in disc initialization. Therefore, the recording/reproducing apparatus can rapidly find the TDMA where the most recent TDMS is recorded.

As mentioned above, the DMA indicator indicates whether the optical write once disc is closed or not.

The disc closing is a state of the disc representing that no more data can be recorded in the disc. The optical write once disc is closed when the disc does not have any more space where the data may be recorded or when desired by the host. After the optical write once disc is closed, the optical write once disc becomes a read-only disc. That is, it is not permitted to record any more data in the optical write once disc. The disc closing is also called as a finalized disc.

If the optical disc is closed, that is, if the optical disc is finalized, the optical recording/reproducing apparatus transfers the most recent management information recorded in the TDMA to a DMA area and a cluster of the DMA indicator in the TAI is changed to a state for representing the closed disc.

Accordingly, the TAI is used as not only information indicating the currently used TDMA but also information representing that the disc is closed.

Data recorded in the cluster of the DMA indicator may be the recent TDDS information or the DDS information recorded in the DMA. This will be explained later in detail.

FIG. 3B shows a method for recording the TAI in a write once dual layer disc having two recording layers in accordance with an embodiment of the present invention.

The TDMA of the dual layer disc may include, in this embodiment, a maximum of five TDMAs (TDMA0 to TDMA4) as mentioned above. Therefore, the TAI information requires fours clusters for managing the five TDMAs as shown in FIG. 3B. Additionally, the TAI further includes one cluster for a DMA indicator.

If the TDMA1 indicator through the TDMA4 indicator are not recorded in the TAI, the TAI represents that the TDMA0 is currently used. If the TDMA1 indicator, but not the TDMA2 through TDMA4 indicator, is recorded in the TAI, the TAI represents that the TDMA1 is currently used and the TDMA0 is fully occupied.

Similarly, if the TDMA2 indicator, but not the TDMA3 through TDMA4 indicator is recorded in the TAI, this represents that the TDMA2 is currently used and the TDMA1 is fully occupied (as is the TDMA0). Also, the TDMA1 indicator will have been recorded. If the TDMA3 indicator, but not the TDMA4 indicator, is recorded in the TAI, this represents that the TDMA3 is currently used and the TDMA2 is fully occupied (as is the TDMA1 and TDMA0). Also, the TDMA2 and TDMA1 indicators will have been recorded. Moreover, if the TDMA4 indicator is recorded in the TAI, this represents that the TDMA4 is currently used and the TDMA3 is fully occupied (as is the TDMA2-TDM0). Also, the TDMA1-TDMA3 indicators will have been recorded.

Stated another way, a TDMA indicator indicates that the corresponding TDMA has been used. Therefore, the TDMA indicator having been recorded and corresponding to the highest numbered TDMA indicates the TDMA currently being used. This also indicates that the lower numbered TDMAs are completely used.

Figure 4B:
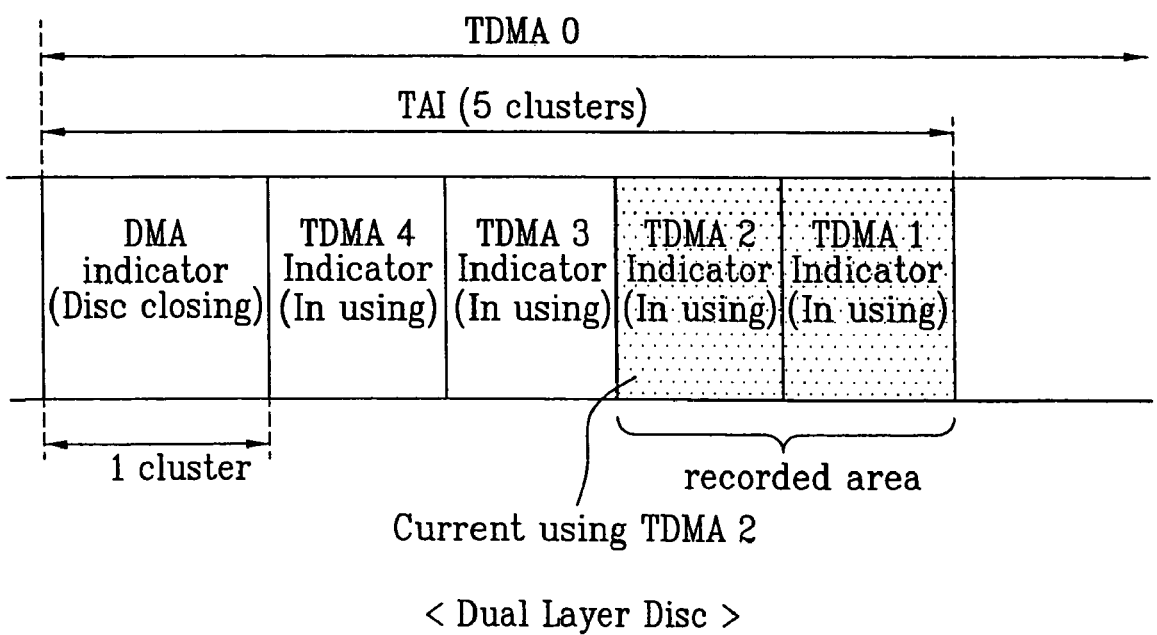

For example, if the TDMA1 indicator and the TDMA2 indicator are recorded in two clusters of the TAI as shown in FIG. 4B, this represents that the TDMA2 is currently used. The TDMA indicators are recorded in the clusters of the TAI in a reverse order of physical sector numbers of the clusters. That is, a lowest number of TDMA indicator occupies highest physical sector number of the clusters allotted to the TAI. By recording the TDMA indicators in the reverse order of the physical sector numbers of the clusters, interference with an optimum power calibration (not shown), which is neighbored to the TDMA0, may be avoided.

When the optical write once disc is loaded in the optical recording/reproducing apparatus, a location of a currently used TDMA can be detected based on the TAI. Thus, the most recently recorded TDMS information can be read from the detected TDMA. That is, initial information can be rapidly obtained for reproducing.

If the TAI does not exist, the optical recording/reproducing apparatus finds the currently used TDMA by scanning TDMAs from the TDMA0. Accordingly, the optical recording/reproducing apparatus may spend lots of time trying to find the currently used TDMA. Such a problem is overcome by the TAI.

In the present embodiment, respective temporary disc definition structure (TDDS) information may recorded in the clusters of the respective TDMA1 indicator to TDMA4 indicator instead of recording dummy data to indicate the currently used TDAM. Accordingly, the optical recording/reproducing apparatus can simultaneously read the TDDS information while confirming a recording state of the TAI. Therefore, the optical recording/reproducing apparatus can rapidly find the TDMA area where the recent TDMS information is recorded.

Meanwhile, in case of the dual layer disc, one cluster of the TDMA0 is allocated to the DMA indicator for indicating the disc closing state of the optical write once disc.

Figure 4C:
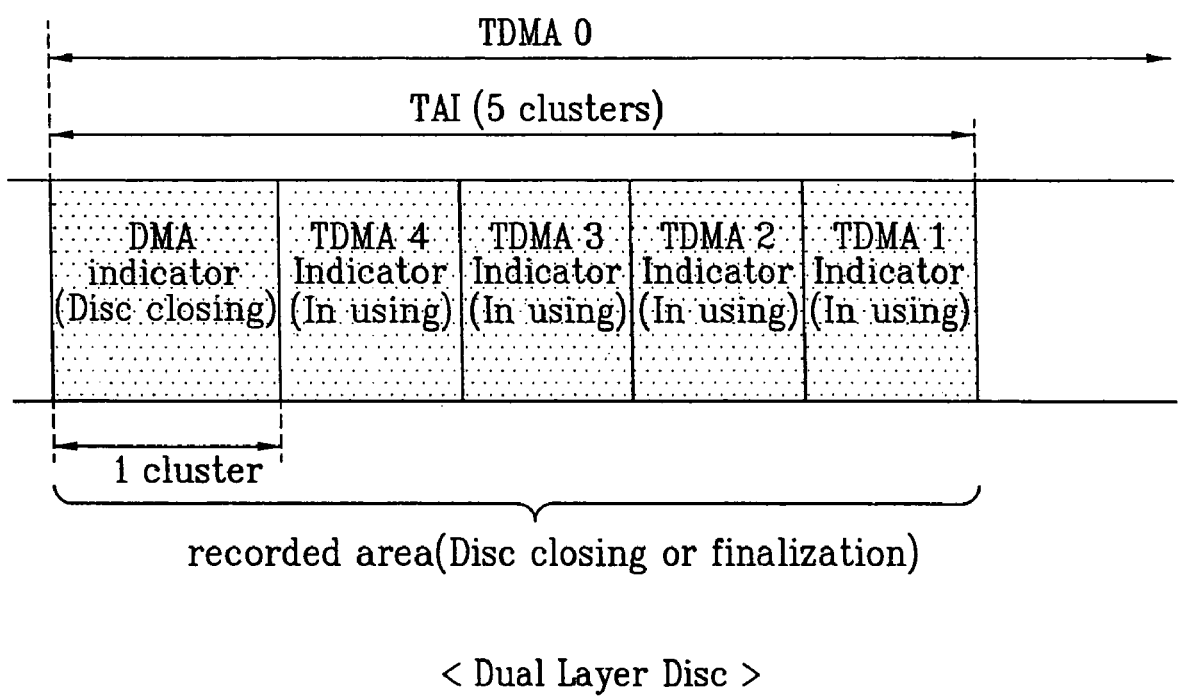

For example, if all TDMA indicators including the TDMA1 indicator to the TDMA4 indicator are recorded in the TAI area as shown in FIG. 4C, this represents the optical write once disc is closed. That is, no more data can be recorded in the write once disc and the write once disc can be read only.

FIG. 5A is a diagram showing various disc defect management information and disc use state information recorded in a TDMA in accordance with an embodiment of the present invention.

As shown in FIG. 5A, the above mentioned temporary disc management information structure (TDMS) information is recorded in the TDMA excepting the TAI area.

The TDMS information is disc management information. The TDMS information is recorded in more than one cluster, which is basic unit of recording. Various information may be included in the TDMS information. Therefore, the various information may be modified or additionally included according to specifications of the write once disc to be standardized. For example, the TDMS information may be include information as described below.

At first, the disc defect management information may include a temporary defect list TDFL, and disc use state information such as sequential recording range information (SRRI) applied to a sequential recording mode or a space-bit map (SBM) applied to a random recording mode. In one or plural clusters of the last sector, a temporary disc definition structure (TDDS) is recorded in the present embodiment. The TDDS includes location information indicating the most recent versions of TDMS information such as the TDFL, the SRRI (or the SBM) and various additional information.

The TDDS is an area including general recording/reproducing information. As described above, pointer information indicating the most recent version (last updated) of the TDFL and SRRI (or SBM) is included in the TDDS. The TDDS is generally first confirmed when the disc is loaded in the optical recording/reproducing apparatus.

The information included in the TDDS is continuously updated according to a use state of the disc. Accordingly, the information of the TDDS is recorded in the last sector of the TDMA. Therefore, various management information according to current use of the disc may be confirmed by reading the last TDDS.

FIG. 5B shows a detail structure of the TDDS.

As shown in FIG. 5B, the TDDS includes a TDDS identifier field and a TDDS format field for indicating the characteristics of the TDDS; a TDDS update count field for providing the number of TDDS updates; a first PSN of drive area field for indicating a currently used drive area for recording various drive information; a first PSN of defect list field for expressing a first physical sector number of a defect list when the disc is closed; a location of LSN 0 of user data area field and a last LSN of user data area field for representing a beginning and an end of the user data area; an inner spare area 0 size field and an outer spare area size field for expressing a size of the spare area; a spare area full flags field for expressing whether the spare area is full or not, and a recording mode field for representing a disc recording mode such as a sequential or a random; a general flag bits field for representing whether the disc is write-protected or not; inconsistency flags for expressing an update state of the TDMS; a last recorded address of user data area field for indicating a location of the last recorded data in the user data area; a size of TDMAs in outer spare area field and a size of TDMA in inner spare area 1 field for representing a size of TDMA allocated in the spare area; a first PSN of $1^{st}$ cluster of defect list field, for representing a first physical sector number of the last defect list in the recent TDMA area, to a first PSN of $8^{th}$ cluster of defect list field, for representing a $8^{th}$ physical sector number of the last defect list in the recent TDMA area, wherein the number of defect list does not exceed a maximum of 4 in a single layer disc and maximum of 8 in double layer disc; a first PSN of SRRI/SBM for L0 field and a first PSN of SBM for L1 field for representing a location of the last recorded SRRI or SBM according to each mode in a sequential or a random recording mode; a next available PSN of ISA0 field, a next available PSN of OSA0 field, a next available PSN of ISA1 field and a next available PSN of OSA1 field for representing next usable physical sector number in the spare area; a year/month/data of recording field for representing recording time; and a drive ID field for representing a manufacturer, an additional ID and a serial number.

The TDDS information including the above mentioned information is updated whenever corresponding information forming the TDDS is updated and the last updated TDDS information becomes the information representing the most recent state of the disc.

If the disc is closed, the latest TDDS is copied as the DDS into the DMA. But, a value of the first PSN of defect list field is recorded with an original value when the latest TDDS is copied.

That is, the value of the first PSN of defect list field in the recorded TDDS may have "00h" before the disc closing. But, after the disc closing, a meaningful value is assigned in the first PSN of the defect list field. This will be explained in detail with reference to FIG. 7B.

Figure 6:
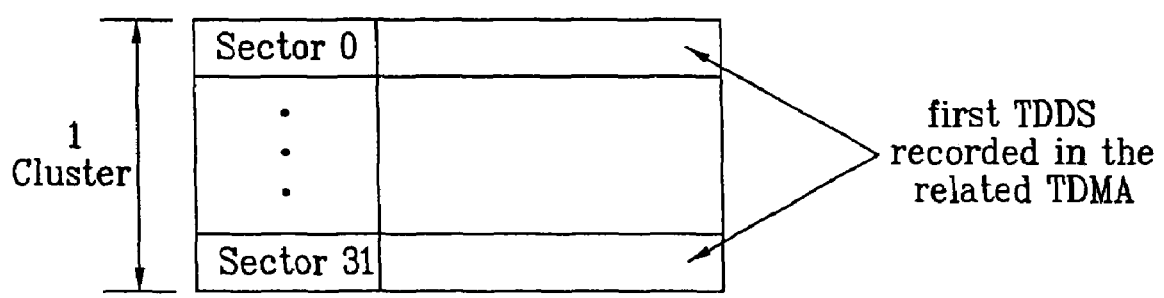
FIG. 6 illustrate a method for recording TDDS in TAI according to an embodiment of the present invention.

FIG. 6 is a diagram showing a method for recording data in a TDMA indicator cluster in a TAI area. The TDMA indicator may be expressed by recording dummy data in the corresponding cluster in the TAI area. However, in the present embodiment, the TDMA indicator is expressed in the TAI area by recording meaningful data in the corresponding cluster in the TAI instead of the dummy data for providing more information.

In the TAI area, each TDMA indicator cluster indicates whether an associated TDMA as a currently used TDMA. In the present embodiment, the TDDS information firstly recorded in the corresponding TDMA is recorded in the corresponding TDMA indicator cluster in the TAI area.

Accordingly, if the optical recording/reproducing apparatus confirms the corresponding TAI area from the loaded disc, it is possible to detect which TDMA is current used from the TAI and to read various information such as allocation of spare area and a size of allocated spare area that are usually recorded in the TDDS in the present embodiment.

The optical recording/reproducing apparatus may then read the latest recorded TDDS from the corresponding TDMA area and obtain the pointer information for the latest recorded TDFL and the SRRI (or SBM) from the latest recorded TDDS. Then, the optical recording/reproducing apparatus may confirm entire recording state of the disc and defect area by reading the latest TDFL and the SRRI (or SBM) recorded in the corresponding area.

FIG. 7A to FIG. 8D show various methods for recording the DMA or TAI information when the disc is closed. A single layer disc is used as an example for explaining the present embodiment. However, it will be readily apparent to those skilled in the art from this disclosure that these examples may be applied to a dual layer disc.

As describe above, when the disc is closed, no more data can be recorded in the disc and the disc becomes a read-only disc. Accordingly, the use of a TDMA is prohibited and the latest TDMS information among the management information is copied to the DMA area.

The disc may be forced closed by the host or the disc may be automatically closed when there is no area left for recording data in the user data area or the TDMA area.

Figure 7A:
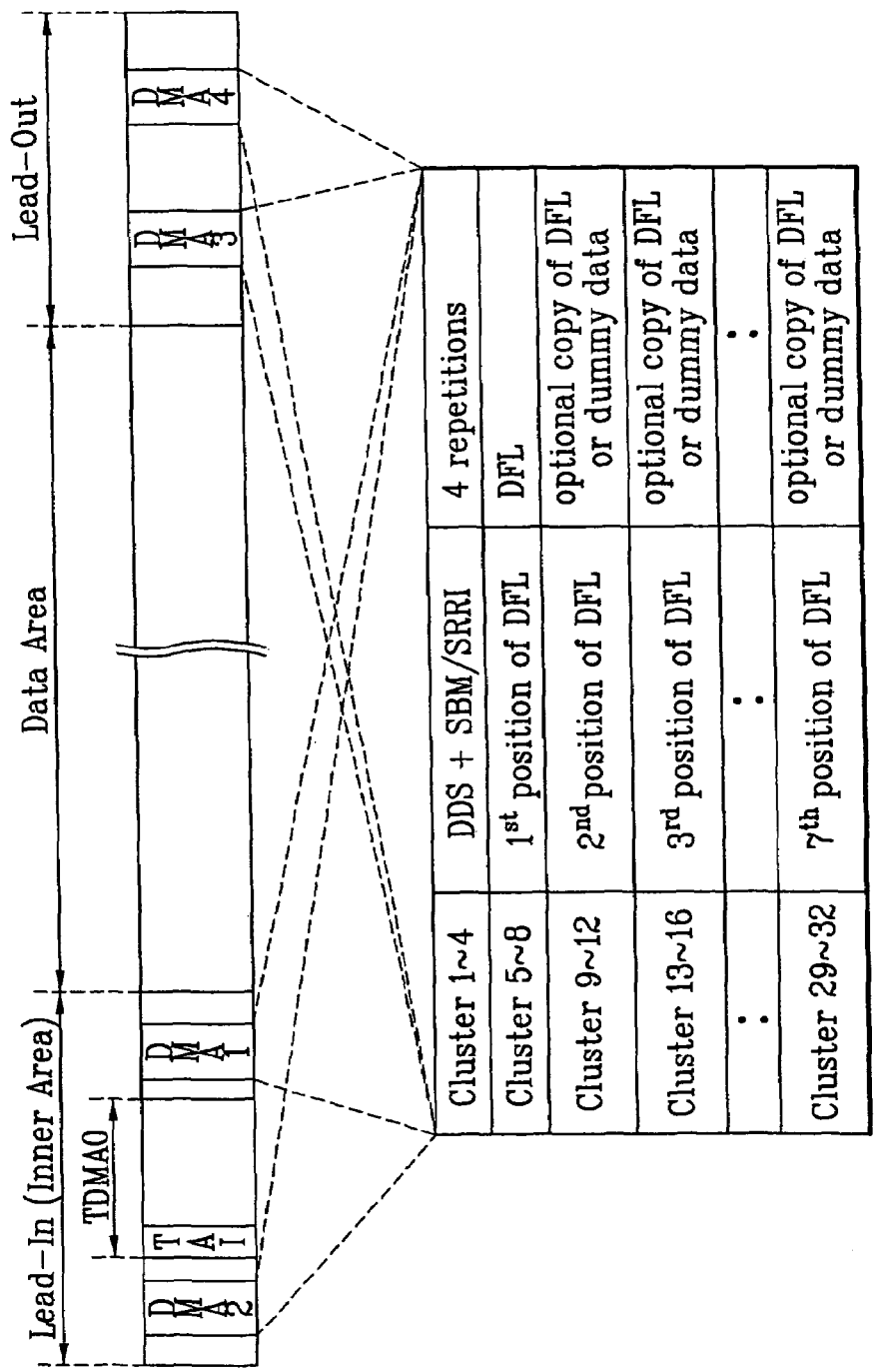

FIG. 7A is a diagram showing a disc structure when the disc is closed. Specially, a structure of management information recorded in the DMA is shown in FIG. 7A. For convenience of explaining the present embodiment, a single layer disc is used as the example.

That is, when the disc is closed, identical management information is recorded in four DMA (DMA1 to DMA4) in the disc. Each DMA includes 32 clusters. The DDS and the SSRI (or SBM) are four times repeatedly recorded in the four clusters 1 to 4. That is, the DDS is recorded in a first sector of the cluster 1 in each DMA. When the disc is closed, the latest TDDS information is copied in the first sector of the cluster 1. But, a location information of the valid DFL recorded in the corresponding DMA is recorded in the first PSN of defect list field among the TDDS information.

As shown in FIG. 7B, basically, the DDS has a similar structure to the TDDS except for the value of the first PSN of defect list field. This is because the first PSN of defect list field indicates a $1^{st}$ position of the DFL in each DMA1, DMA2, DMA3 and DMA4.

Accordingly, the value of the first PSN of defect list field is "00h" in the TDDS structure shown in FIG. 5B and the first PSN of defect list fields in the DMA1, DMA2, DMA3, DMA4 have different unique position values.

The latest SRRI (or SMB) and the TDFL information recorded in the each TDMA are copied to the DMA as the SRRI (or SBM) and the DFL of the DMA. Specially, an area where the DFL is recorded includes a total or 28 clusters from a cluster 5 to a cluster 32. Four clusters are gathered as one group so that identical DFL information is recorded 7 times. Also, according to a system, it is possible to record the DFL in clusters 5 to 8 and dummy data is repeatedly recorded in the clusters 9 to 32.

Figure 8A:
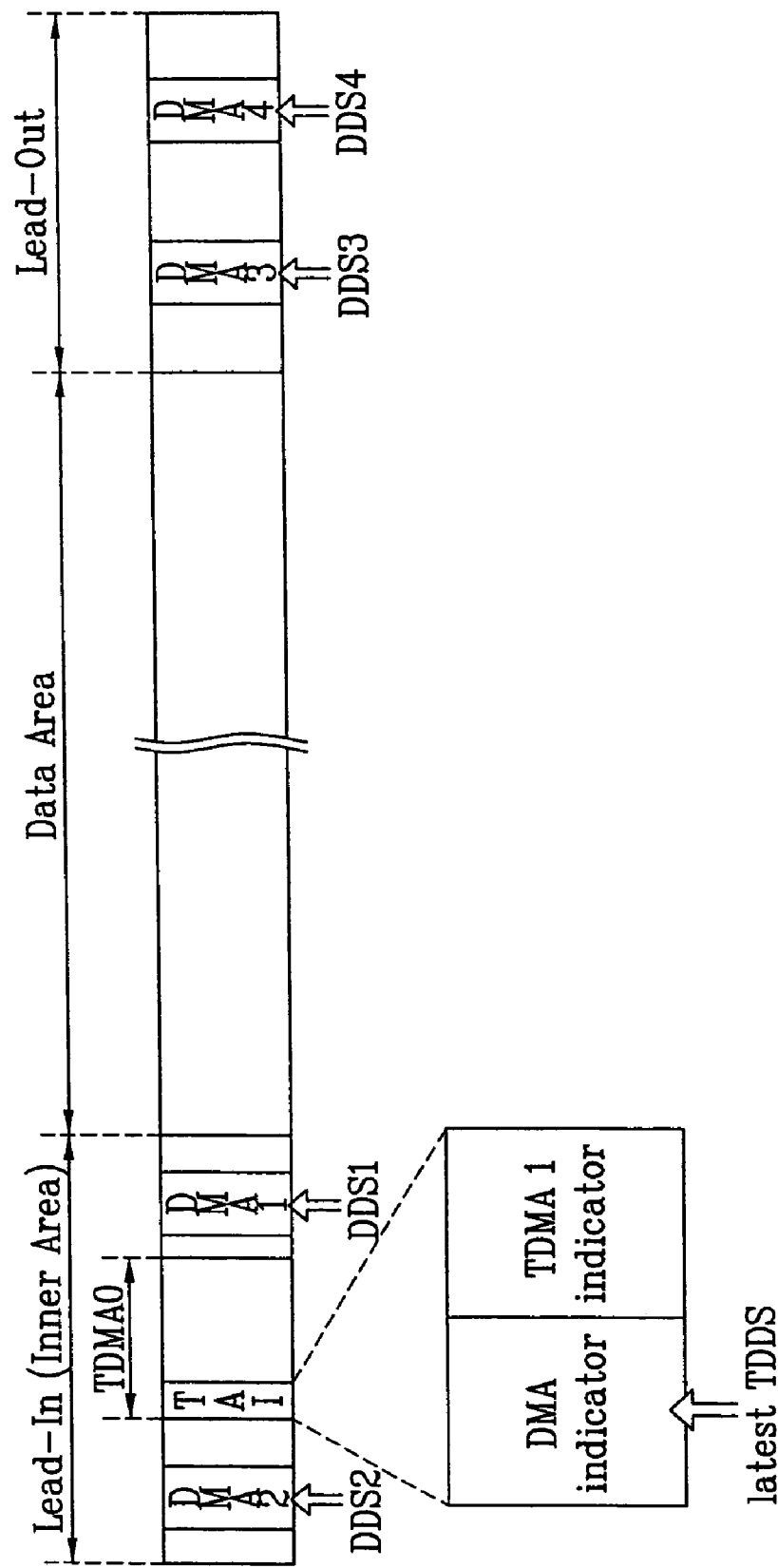
FIGS. 8A to 8D illustrate management information recorded in TAI and DMA according to an embodiment of the present invention when a disc is closed.
Figure 8B:
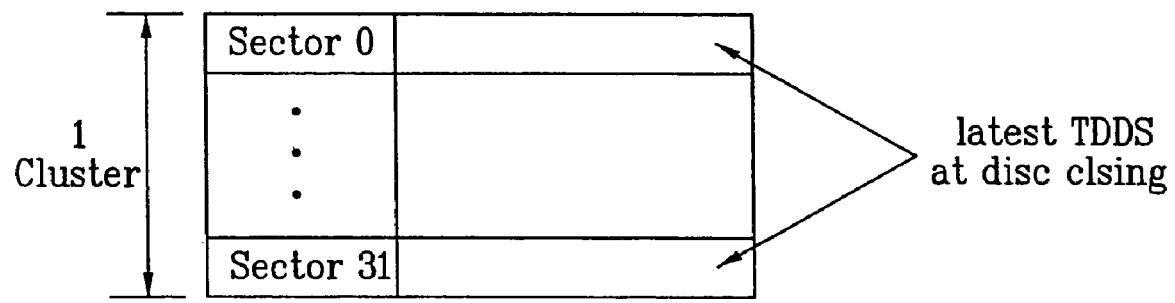

FIGS. 8A and 8B are diagrams for showing a method for recording DMA and TAI when a disc is closed according to a first embodiment of the present invention.

When the disc is closed, a state of the DMA indicator cluster in the TAI is changed by being recorded in for representing the disc closing state. In the DMA indicator cluster, dummy data may be recorded. However, in the present embodiment, meaningful data is recorded in the DMA indicator cluster for not only representing the disc closing state but also for transferring the meaningful data. Also, when the disc is closed, management information having a data structure shown in FIG. 7A is recorded in the each DMA.

As shown in FIG. 8A, the latest TDDS information may be recorded in the DMA indicator cluster of the TAI according to the present embodiment.

That is, for closing the disc, the latest TDDS information is recorded in the DMA indicator cluster in the TAI and identical DSS/SRRI (or SMI)/DFL are recorded in four DMAs. Among the DDS information, only the first PSN of defect list fields have different values from the TDDS. For showing the four different values of the first PSN of defect list fields, DDS1 to DDS4 are shown in FIG. 8A.

FIG. 8B shows information recorded in the DMA indicator cluster according to the FIG. 8A. The latest TDDS information recorded in the DMA indicator cluster may be recorded in one sector, and the DMA indicator cluster includes 32 sector. Therefore, the latest TDDS may also be repeatedly recorded in the 32 sectors of the DMA indicator cluster. But, according to a system, the latest TDDS may be recorded in one sector and dummy data may be recorded in the other sectors. Or the latest TDDS may be repeatedly recorded in predetermined sectors.

Accordingly, when the closed disc is loaded into the optical recording/reproducing apparatus, the optical recording/reproducing apparatus confirms whether the DMA indicator cluster is recorded or not to determine whether the disc is closed or not. At the same time, the optical recording/reproducing apparatus obtains useable information from the latest TDDS information recorded in the DMA indicator cluster in the TAI. Then, the optical recording/reproducing apparatus checks the final disc defect list (DFL) and the recording state information SRRI and SBM by reading data recorded in the DMA area.

Figure 8C:
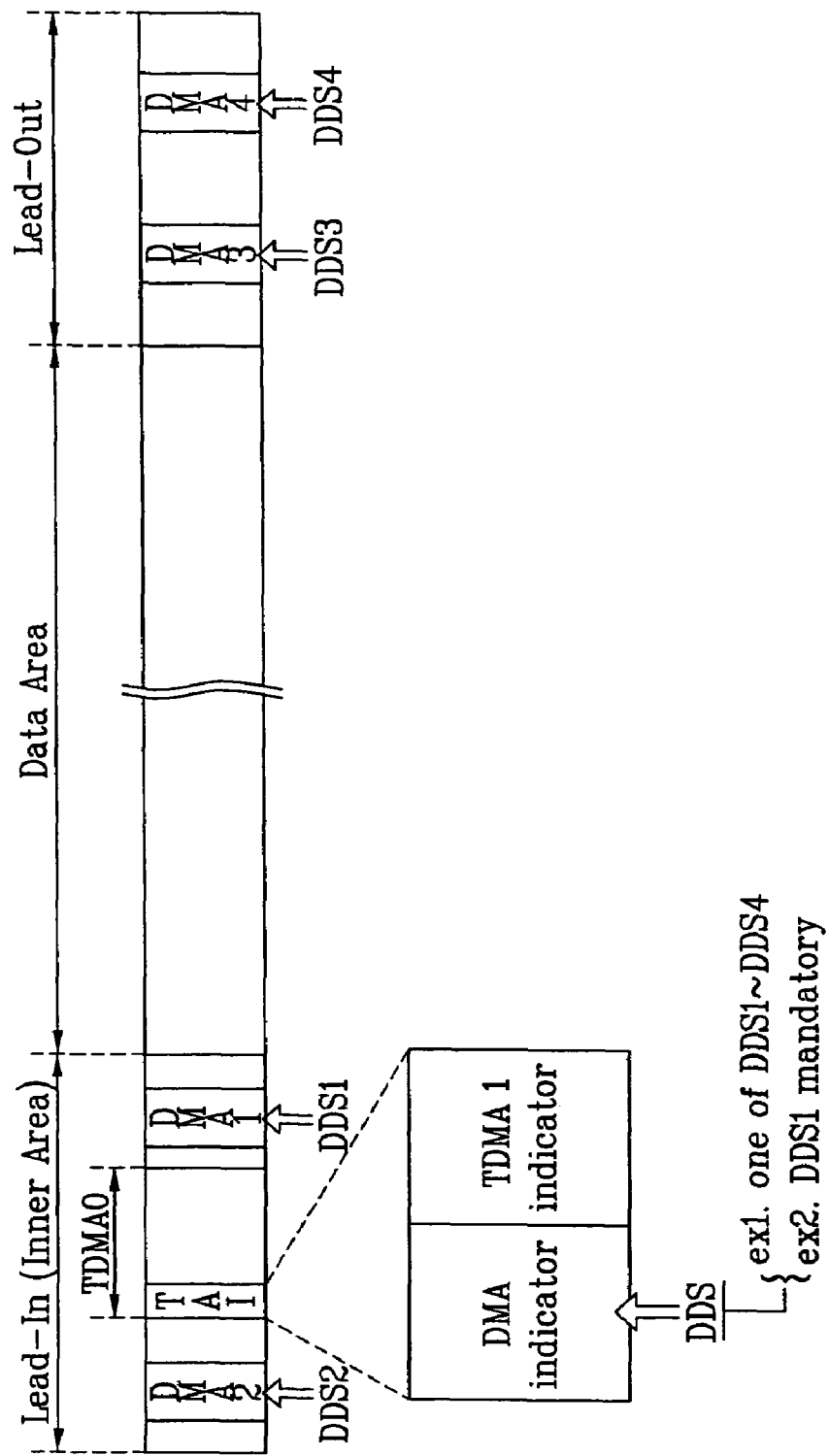
Figure 8D:
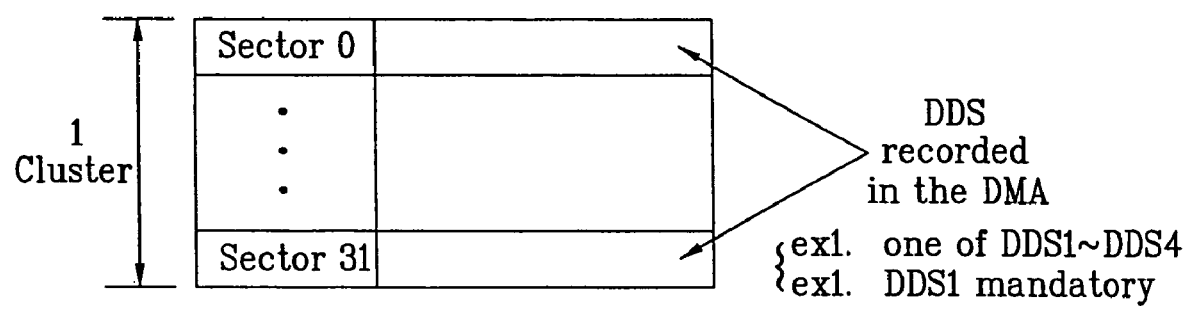

FIGS. 8C and 8D are diagrams showing a method of recording the DMA and the TAI when the disc is closed according to a second embodiment of the present invention. Specially, the DDS information is recorded in the DMA indicator cluster in the TAI in the second embodiment of the present invention.

For performing the disc closing, identical DDS/SSRI (or SBM)/DFL is recorded in four DMA areas. Only the first PSN of defect list fields have different values among the DDS information. For convenience, they are shown as DDS1 to DDS4.

One of the DDS information is recorded in the DMA indicator cluster in the TAI for changing a recording state of the corresponding cluster. The recorded DDS information may be one of the DDS1 to DDS4 or the DDS1 is recorded by default.

FIG. 8D shows information recorded in the DMA indicator cluster according to FIG. 8C. The DSS information recorded in the DMA indicator cluster may be recorded in one sector. The DMA indicator cluster includes 32 sectors. Therefore, the DSS information may also be repeatedly recorded in the 32 sectors of the DMA indicator cluster as shown in FIG. 8D. But, according to a system, the DSS information may be recorded in one sector and dummy data may be repeatedly recorded in the other 31 sectors. Or, the DSS information may be repeatedly recorded in selected sectors in the DMA indicator cluster.

Accordingly, when the closed disc is loaded in the optical recording/reproducing apparatus, the optical recording/reproducing apparatus confirms whether the DMA indicator cluster is recorded or not to determine whether the disc is closed or not. At the same time, the optical recording/reproducing apparatus obtains useable information from the final DDS information recorded in the DMA indicator cluster in the TAI. Then, the optical recording/reproducing apparatus checks the final disc defect list (DFL) and the recording state information SRRI and SBM by reading data recorded in the DMA area.

The type of information to be recorded in the DMA indicator cluster in the TAI when the disc is closed may be standardized to one of embodiments as shown in FIGS. 8A and 8C for compatibility between optical recording/reproducing apparatuses in order to effectively use the information recorded in the DMA indicator cluster.

FIG. 9 is a block diagram illustrating an optical recording/reproducing apparatus in accordance with an embodiment of the present invention. As shown in FIG. 9, the optical recording/reproducing apparatus includes a recording/reproducing unit 10 for recording data on a disc and reproducing the recorded data and a controlling unit (or host) 20 for controlling the recording/reproducing unit 10.

The controlling unit 20 transfers a command for recording data on a predetermined area or a command for reproducing recorded data. The recording/reproducing unit 10 records data on a predetermined area or reproduces the recorded data based on the transferred command from the controlling unit 20. The recording/reproducing unit 10 is generally called an optical drive.

The recording/reproducing unit 10 includes an interfacing unit 12 for communicating with an external device; a pickup unit 11 for recording or reproducing data on the optical disc; a data-processor 13 for receiving a reproduced signal from the pickup unit and converting the received reproduced signal to a target signal value, or modulating a signal to be recorded in the optical disc and transferring the modulated signal to the pickup unit 11; a servo unit 14 for controlling the pickup unit 11 in order to accurately record a signal to the optical disc; a memory 15 for temporally storing various information and data; and a microcomputer 16 for controlling the above mentioned elements of the recording/reproducing unit 10.

Hereinafter, a method for recording/reproducing the TAI information and a method for closing a disc in the optical recording/reproducing apparatus in accordance with an embodiment of the present invention will be explained in detail.

When a disc is loaded in the optical recording/reproducing apparatus, the optical recording/reproducing apparatus confirms a recording state of the TAI of the loaded disc for determining whether the loaded disc is closed or not and detecting a position of a currently used TDMA.

If the disc is not closed yet, the microcomputer 16 obtains the currently used TDMA from the TAI information, reads the latest TDMS information in the currently used TDMA and reads the disc recording state and the defect information from the latest TDMS information. The microcomputer 16 also notifies the controlling unit 20 that the loaded disc is not closed. Then, if a command for recording or reproducing data is input from the controlling unit 20, the recording/reproducing unit 10 records data or reproduce data in a target area.

In performing recording, the microcomputer 16 updates the TDMS in the TDMA area based on any well-known method. If a predetermined TDMA(k) is fully occupied by updating, the microcomputer 16 uses another TDMS(k+1) to update the TDMS. When the TDMS is firstly updated in the TDMA(k+1), the first TDDS information recorded in the TDMA(k+1) is recorded in the TDMA(k+1) indicator cluster in the TAI area.

When the disc is closed, predetermined information is recorded in the DMA indicator cluster in the TAI and the DMA area based on one of methods shown in FIG. 8A or 8C, which is decided as a standard for representing the loaded disc is closed.

If the loaded disc is a closed disc, the microcomputer 16 reads the final recording state and the defect information from information recorded in the DMA indicator cluster in the TAI and the DMA area. And then, the microcomputer 16 notifies the controlling unit 20 that the loaded disc is the closed disc and performs reproducing data according to a control of the controlling unit 20.

Hereinafter, a method for recording management information of a disc in accordance with an embodiment of the present invention will be explained with reference to FIGS. 10 to 12.

Figure 10:
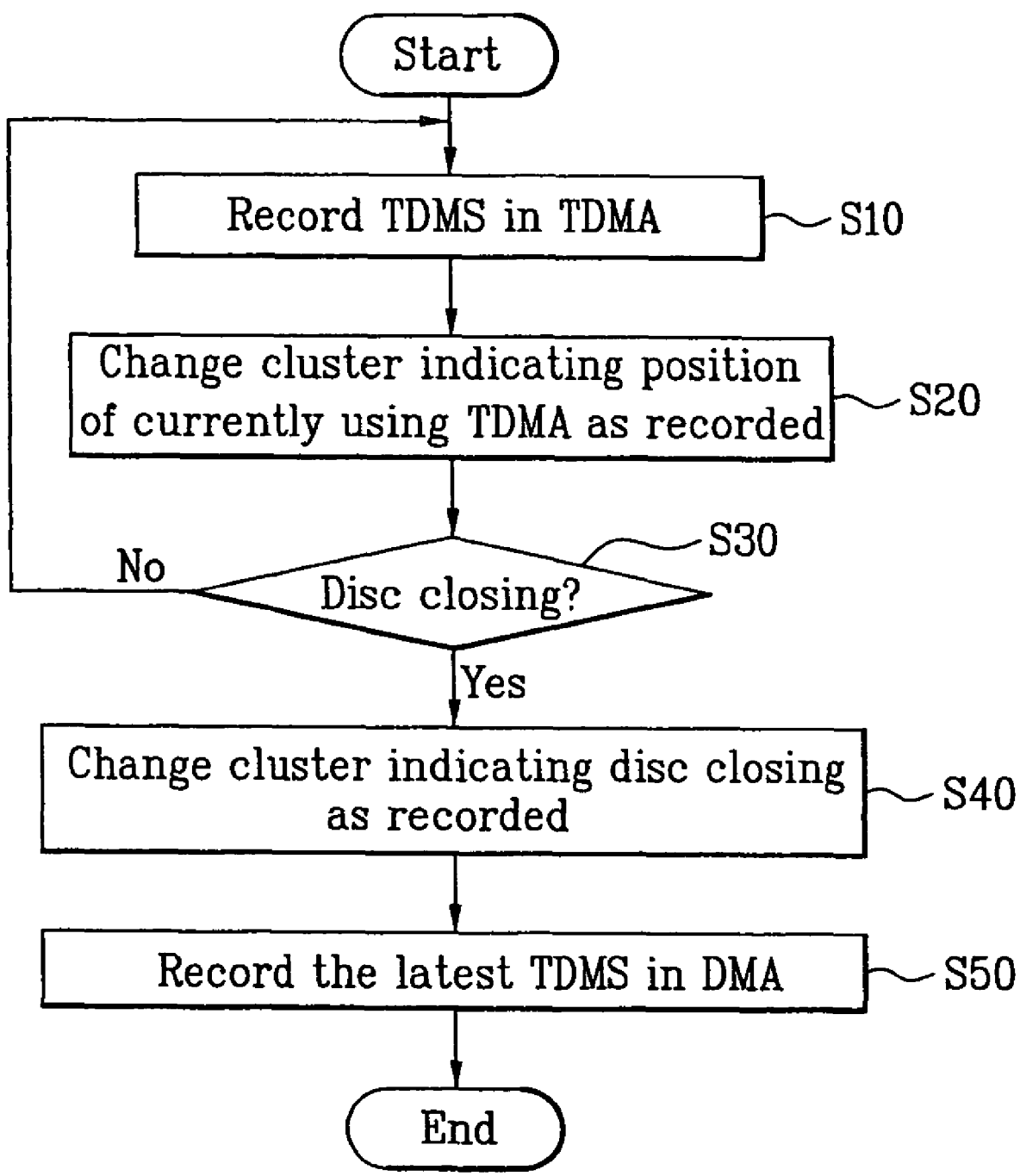
FIGS. 10 to 12 illustrate a method for recording management information of an optical write once disc in accordance with an embodiment of the present invention.
Figure 11:
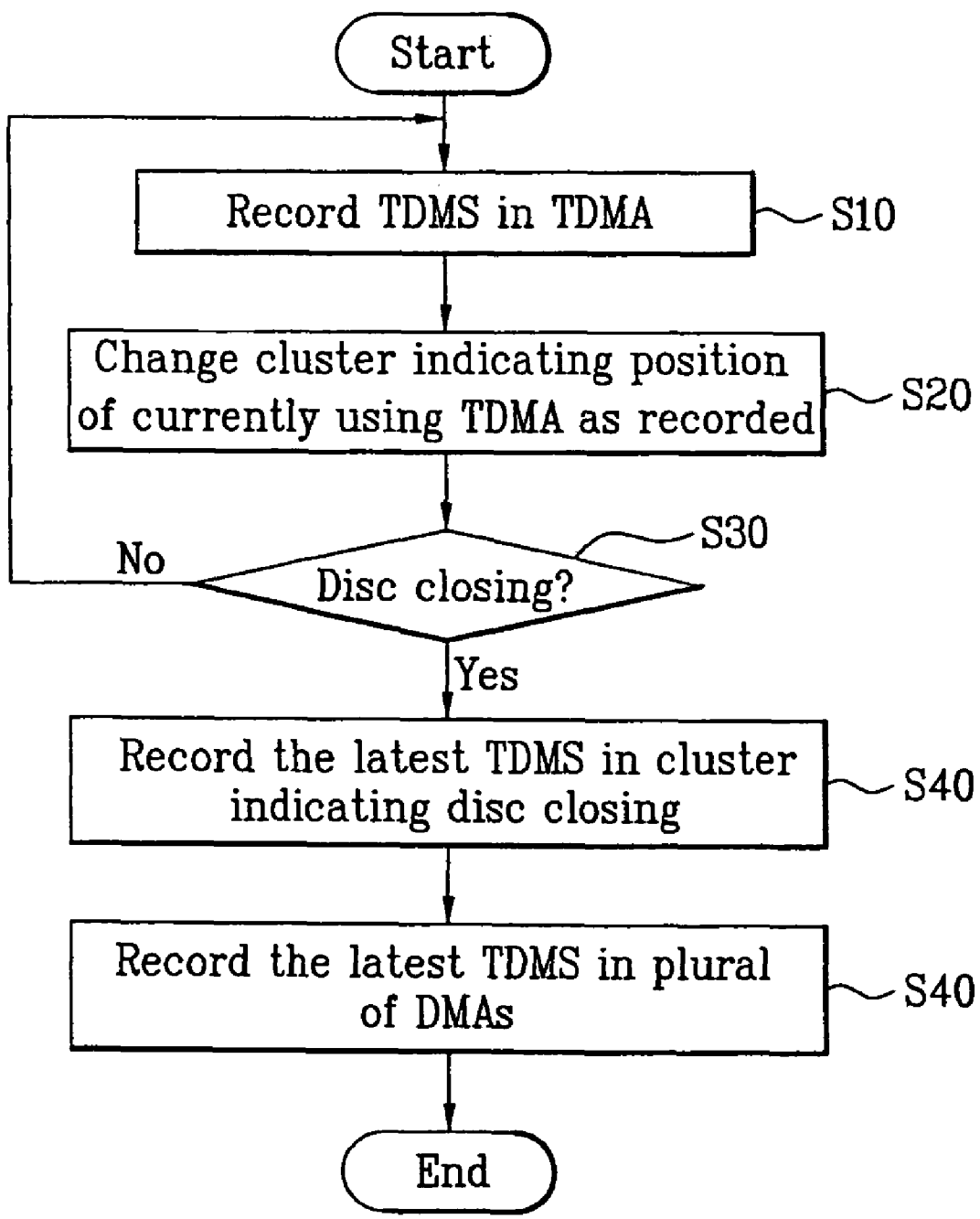
Figure 12:
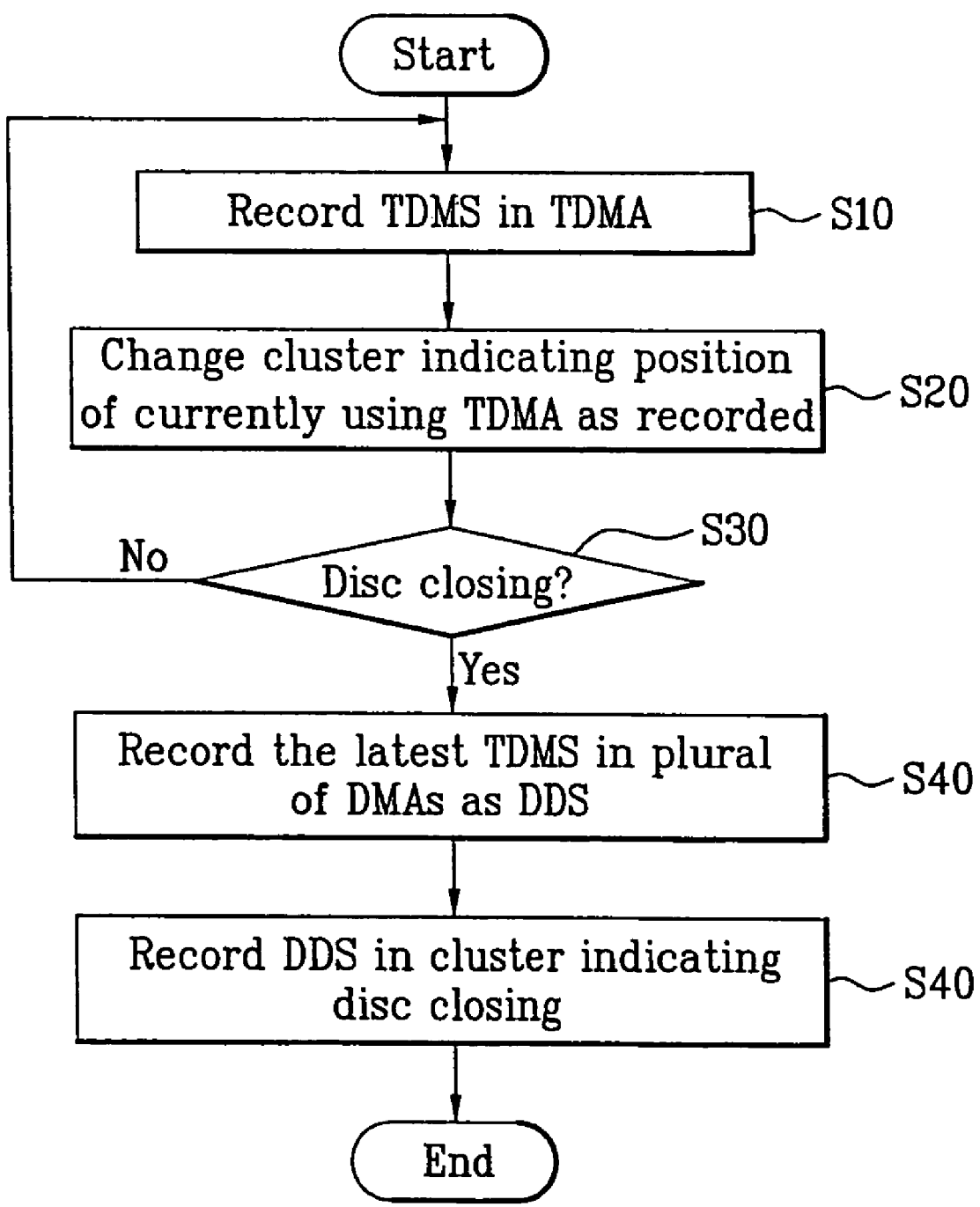

FIGS. 10 to 12 are flowcharts illustrating a method of recording management information of a disc in accordance with an embodiment of the present invention.

As shown in FIG. 10, TDMS is recorded in a TDMA according to data recorded in the disc before disc closing at step S10.

A recording state of a TDMA indicator cluster is changed for representing a position of a currently used TDMA among a plurality of TDMAs at step S20.

When the disc is closed, a recording state of a cluster indicating the disc closing is modified at step S40 and the latest TDMS recorded in the TDMA is recorded in the DMA at step S50.

As shown in FIG. 11, the latest TDDS may be recorded in the cluster indicating the disc closing at step S40 and the latest TDDS may be recorded in plural of the DMAs as the DDS information at the step S50.

Also, as shown in FIG. 12, the latest TDDS may be recorded in plural of the DMAs during the disc is closing at step S40 and the DDS information is recorded in the cluster indicating the disc closing at step S50.

While the invention has been disclosed with respect to a limited number of embodiments, those skilled in the art, having the benefit of this disclosure, will appreciate numerous modifications and variations there from. For example, while described with respect to a Blu-ray write-once optical disk in several instances, the present invention is not limited to this standard of write once optical disk or to write-once optical disks. Instead, the embodiments of the present invention may find application to other write-once recording media. It is intended that all such modifications and variations fall within the spirit and scope of the invention.

What is claimed is:

1. An apparatus for recording management information on a recording medium, the recording medium including one or more temporary defect management areas (TDMAs) being used in a designated order and a plurality of defect management areas (DMAs), the apparatus comprising:
a pickup configured to record data onto the recording medium: and
a microcomputer configured to control the pickup so as to record, onto a TDMA access indicator located in a first TDMA being used first among the one or more TDMAs, a temporary disc definition structure (TDDS) recorded first in a TDMA associated with the TDMA access indicator when the associated TDMA is in use, the TDDS including 00h at a position information field for indicating a position of a valid defect list; and
the microcomputer configured to control the pickup to record onto a DMA access indicator located in the first TDMA indicating whether or not the recording medium is closed, a disc definition structure (DDS) recorded in one of the DMAs when closing the recording medium so as to indicate that the recording medium is closed, the DDS including a start address of a valid defect list within the DMA as position information.

2. The apparatus of claim 1, wherein the DMA access indicator comprises one cluster and the microcomputer is configured to use a first head cluster of the first TDMA as the DMA access indicator.

3. The apparatus of claim 1, wherein the microcomputer is configured to control the pickup so as to record data onto a TDMA access indicator among one or more TDMA access indicators located in the first TDMA for indicating which TDMA is an in-use TDMA, where the one or more TDMA access indicators respectively correspond to the TDMAs except the first TDMA.

4. The apparatus of claim 3, wherein each of the one or more TDMA access indicators comprises one cluster and the microcomputer is configured to use one or more clusters starting from a second head cluster of the first TDMA as the one or more TDMA access indicators.

5. An apparatus for reproducing management information recorded in a recording medium, the recording medium including one or more temporary defect management areas (TDMAs) being used in a designated order and a plurality of defect management areas (DMAs), the apparatus comprising:
a pickup configured to reproduce data from the recording medium; and
a microcomputer configured to control the pickup to read a copy of a temporary disc definition structure (TDDS) from one or more TDMA access indicators located in a first TDMA used first among the one or more TDMAs, the one or more TDMA access indicators including a copy of TDDS recorded first in the corresponding TDMA when the corresponding TDMA is in use, and the microcomputer being configured to determine the TDMA which is in use based on the copy of the TDDS, the TDDS including 00h at a position information field for indicating a position of a valid defect list; and
the microcomputer configured to control the pickup to read a DMA access indicator located in the first TDMA and control the pickup to read management information recorded in a DMA if the DMA access indicator has recorded data therein, wherein the recorded data in the DMA access indicator is a copy of disc definition structure (DDS) recorded in one of the DMAs, the DDS including a start address of a valid defect list within the DMA as position information.

6. The apparatus of claim 5, wherein the DMA access indicator comprises one cluster and a first head cluster of the first TDMA is used as the DMA access indicator, wherein the microcomputer is configured to control the pickup to read the first head cluster so as to determine whether the recoding medium is closed.

7. The apparatus of claim 5, wherein the microcomputer is configured to control the pickup to read the one or more TDMA access indicators located in the first TDMA so as to access an in-use TDMA if the DMA access indicator has no recorded data, where the one or more TDMA access indicators respectively correspond to the TDMAs except the first TDMA, and control the pickup to access a TDMA corresponding to a last TDMA access indicator having recorded data.

8. The apparatus of claim 7, wherein each of the one or more TDMA access indicators comprises one cluster and one or more clusters starting from a second head cluster of the first TDMA are used as the one or more TDMA access indicators, wherein the microcomputer is configured to control the pickup to read the one or more clusters starting from the second head cluster so as to determine the in-use TDMA.

9. A recording medium, comprising:
one or more temporary defect management areas (TDMAs) being used in a designated order;
one or more TDMA access indicators being located in a first TDMA being used first among the one or more TDMAs and indicating whether a corresponding TDMA is in use, the one or more TDMA access indicators including a copy of a temporary disc definition structure (TDDS) recorded first in the corresponding TDMA when the corresponding TDMA is in use, the TDDS including 00h at a position information field for indicating a position of a valid defect list;
a plurality of defect management areas (DMAs); and
a DMA access indicator being located in the first TDMA and indicating whether or not the recording medium is closed, where the DMA access indicator stores therein data when the recording medium is to be closed, wherein the data being stored in the DMA access indicator is a copy of a disc definition structure (DDS) recorded in one of the DMAs, the DDS including a start address of a valid defect list within the DMA as position information.

10. A method of recording management information on a recording medium, the recording medium including one or more temporary defect management areas (TDMAs) being used in a designated order and a plurality of defect management areas (DMAs), the method comprising:
recording, onto a TDMA access indicator located in a first TDMA being used first among the one or more TDMAs, a temporary disc definition structure (TDDS) recorded first in a TDMA associated with the TDMA access indictor when the associated TDMA is in use, the TDDS including 00h at a position information field for indicating a position of a valid defect list; and
recording, onto a DMA access indicator located in the first TDMA and indicating whether or not the recording medium is closed, and a disc definition structure (DDS) recorded in one of the DMAs when closing the recording medium so as to indicate that the recording medium is closed, the DDS including a start address of a valid defect list within the DMA as position information.

11. A method of reproducing management information recorded in a recording medium, the recording medium including one or more temporary defect management areas (TDMAs) being used in a designated order and a plurality of defect management areas (DMAs), the method comprising:
reading a copy of a temporary disc definition structure (TDDS) from one or more TDMA access indicators located in a first TDMA being used first among the one or more TDMAs, the one or more TDMA access indicators including a copy of the TDDS recorded first in a corresponding TDMA when the corresponding TDMA is in use, the TDDS including 00h at a position information field for indicating a position of a valid defect list;
determining a TDMA which is in use based on the copy of the TDDS;
reading a DMA access indicator located in the first TDMA; and
accessing management information recorded in a DMA, if the DMA access indicator has recorded data,
wherein the recorded data in the DMA access indicator is a copy of a disc definition structure (DDS) recorded in one of the DMAs, the DDS including a start address of a valid defect list within the DMA as position information.

12. The method of claim 11, wherein the TDDS includes position information for indicating a position of defect list within the corresponding TDMA.

13. The method of claim 11, wherein the DDS includes position information for indicating a position of defect list within the DMA.

* * * * *

UNITED STATES PATENT AND TRADEMARK OFFICE
CERTIFICATE OF CORRECTION

| | | |
|---|---|---|
| PATENT NO. | : 7,969,841 B2 | Page 1 of 1 |
| APPLICATION NO. | : 12/457362 | |
| DATED | : June 28, 2011 | |
| INVENTOR(S) | : Yong Kook Kim | |

It is certified that error appears in the above-identified patent and that said Letters Patent is hereby corrected as shown below:

On the Title Page & Col. 1 lines 1-4

Please replace the title with the following title:

METHOD AND APPARATUS FOR RECORDING MANAGEMENT INFORMATION ON A RECORDING MEDIUM AND THE RECORDING MEDIUM

Signed and Sealed this
Twenty-seventh Day of September, 2011

David J. Kappos
*Director of the United States Patent and Trademark Office*